US007849098B1

(12) United States Patent
Scales et al.

(10) Patent No.: US 7,849,098 B1
(45) Date of Patent: Dec. 7, 2010

(54) PROVIDING MULTIPLE CONCURRENT ACCESS TO A FILE SYSTEM

(75) Inventors: Daniel J. Scales, Mountain View, CA (US); Satyam B. Vaghani, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1120 days.

(21) Appl. No.: 10/773,613

(22) Filed: Feb. 6, 2004

(51) Int. Cl.
*G06F 7/00* (2006.01)
*G06F 17/30* (2006.01)

(52) U.S. Cl. .................................................... 707/781

(58) Field of Classification Search ..................... 707/8, 707/10

See application file for complete search history.

(56) References Cited

U.S. PATENT DOCUMENTS

| | | | | |
|---|---|---|---|---|
| 5,692,178 | A * | 11/1997 | Shaughnessy | 707/8 |
| 6,389,420 | B1 * | 5/2002 | Vahalia et al. | 707/8 |
| 6,658,417 | B1 * | 12/2003 | Stakutis et al. | 707/10 |
| 7,107,267 | B2 * | 9/2006 | Taylor | 707/8 |
| 7,124,131 | B2 * | 10/2006 | Guthridge et al. | 707/8 |
| 7,289,992 | B2 * | 10/2007 | Walker | 707/8 |
| 2006/0069665 | A1 * | 3/2006 | Yamakawa et al. | 707/1 |

OTHER PUBLICATIONS

Windows 2000 Support, How to specify an IP address, Last revised Oct. 31, 2006, Microsoft, http://support.microsoft.com/kb/308199.*
Helmig, Windows 2000/XP TCP/IP protocol, Feb. 18, 2001, WindowsNetworking.com, http://www.windowsnetworking.com/articles_tutorials/w2ktcpip.html.*
The Authoritative Dictionary of IEEE Standards Terms, 2000, IEEE, 7th ed, p. 318.*

* cited by examiner

*Primary Examiner*—Kuen S Lu
*Assistant Examiner*—Jason Liao
(74) *Attorney, Agent, or Firm*—Darryl A Smith

(57) ABSTRACT

Multiple computers are connected to a data storage unit that includes a file system, which further includes multiple data entities, including files, directories and the file system itself. The file system also includes, for each data entity, an owner field for indicating which computer, if any, has exclusive or shared access to the data entity, along with a time field for indicating when a lease of the data entity began. When a computer wants to lease a data entity, the computer uses a disk reservation capability to temporarily lock the data storage unit, and, if the data entity is not currently leased, the computer writes its own identification value into the owner field and a current time into the time field for the data entity, to claim the data entity for a renewable lease period. If a prior lease of a data entity has expired, another computer may break the lease and claim ownership for itself.

25 Claims, 10 Drawing Sheets

PROVIDING MULTIPLE CONCURRENT ACCESS TO A FILE SYSTEM

BACKGROUND OF THE INVENTION

1. Field of the Invention

This invention relates to a distributed file system within a computer system, or, more specifically, to providing multiple computers or other computing entities with concurrent access to a file system while maintaining the integrity and coherence of the file system.

2. Description of the Related Art

Historically, a file system has often been accessible to only one computer at a time. For example, most computers have a local disk drive within the computer that contains a file system that historically has only been accessible to that computer. If multiple computers are given concurrent, unrestricted access to a typical file system the data in the file system will likely become corrupted. For example, suppose that a first computer and a second computer are connected to a disk drive containing a single file system. The computers may be connected to the disk drive by a SCSI interface (Small Computer System Interface), for example. Now if both computers are allowed to read and write file data and file system configuration data at will, a wide variety of conflicts can occur. As an example, suppose both computers are accessing the same file on the disk drive, and they both try to write to the end of the file at the same time. If only one write can actually be performed to the disk at a time, then the two writes will occur one after the other, and the second write will generally overwrite the data that was written in the first write, causing the data of one of the computers to be lost. As another example, suppose that both computers attempt to add a new directory to the file system at the same time. Again, a reference to a first directory created by the first computer may be overwritten by a reference to a second directory created by the second computer. Thus, to provide multiple computers with concurrent access to a common file system on a shared data store, without corrupting the data and the file system, one or more locking and/or coherence mechanisms must generally be implemented.

This invention may be implemented in any such situation in which it is advantageous for multiple computers or other computing entities to have concurrent access to a common file system, and this invention will improve the integrity and coherence of the file system and the data contained in the file system. The most common such situation in which the invention may be advantageously implemented involves multiple server computers connected to a data storage unit, such as through a data network. Thus, the preferred embodiment of the invention is described as being implemented in such a computer system comprising a data storage unit, multiple servers and some means of interconnecting the servers with the data storage unit. In many cases when multiple servers are connected to a data storage unit, however, each server has its own file system within the data storage unit, so that concurrent access to a common file system is not necessary. There are, however, other situations in which it is advantageous for multiple servers or other computers to have concurrent access to a common file system. One such situation is where multiple virtual machines (VMs) execute on multiple physical servers and share the same file system on a shared data store. Implementing the invention in such a system in which multiple VMs execute on multiple physical servers and share the same file system is particularly advantageous for several reasons, as described briefly below.

Now there are known techniques for enabling multiple computers to share a common file system. FIGS. 1A and 1B, for example, illustrate two different system configurations that have been used to give multiple servers access to a common file system.

FIG. 1A illustrates a computer system in which multiple servers access a common file system indirectly, by using a file server as an intermediary. FIG. 1A shows a plurality of servers 10, 12 . . . 18 connected together through a local area network (LAN) 20, which also interconnects with a file server 30. The file server 30 is connected to a data storage unit 40.

The data storage unit 40, illustrated in FIG. 1A and in other figures in this application, may be any data storage medium or any combination of data storage media that can hold a file system. Thus, the data storage unit 40 may be anything from a simple disk drive device to a complex combination of various data storage devices and/or systems. The data storage unit 40 includes a file system 41, which may be any conventional file system, such as a New Technology File System (NTFS) from Microsoft Corporation or a UNIX or Linux file system. The file server 30 may be a conventional file server, such as a server based on an x86 architecture from Intel Corporation, running a conventional operating system (OS), such as a Linux OS distribution, a Windows OS from Microsoft Corporation or a UNIX OS, along with a standard file server application. The file server 30 may be connected to the data storage unit 40 by any conventional means, such as through a SCSI interface. The local area network 20 may be a conventional computer network, such as an Ethernet network. Also, the servers 10, 12 and 18 may be any conventional server, such as a server based on the x86 architecture, running a conventional OS.

Now the servers 10, 12 and 18 do not access the file system 41 directly. The server 10 cannot, for example, directly mount the file system 41 or directly open a file within the file system 41. Instead, the servers 10, 12 and 18 must interact with the file server 30 to obtain access to the file system 41. For example, the server 10 may request that a directory be added to the file system 41, but it is the file server 30 that actually accesses the file system 41 to add the directory. Similarly, if the server 12 desires access to a file within the file system 41, the file server 30 actually reads data from the file or writes data to the file, as requested by the server 12. In this configuration, only one server, namely the file server 30, ever has access to the file system 41. Thus, this is not a distributed file system, in which multiple computers have concurrent access to a common file system.

The configuration of FIG. 1A is not desirable in many situations because the file server 30 can be a bottleneck that substantially slows down the speed at which the servers 10, 12 and 18 may interact with the file system 41. Interactions with the file system 41 may only proceed as fast as the file server 30 is able to service the requests of the servers 10, 12 and 18 and transfer the data between the servers and the data storage unit 40. Also, the file server 30 represents a single point of failure in the servers' ability to access the file system 41. A distributed file system is generally desirable in such situations, so that each of the servers 10, 12 and 18 may access the data storage unit 40 independently and redundantly, without having to go through the file server 30 to obtain access.

FIG. 1B illustrates a computer system that implements a prior art distributed file system. In this system, multiple servers access a common file system through a data storage network, and they communicate locking information with each other using a separate computer network. FIG. 1B shows the same plurality of servers 10, 12 . . . 18 connected together through the same local area network 20. FIG. 1B also shows the same data storage unit 40, including the same file system 41. This time, however, the servers 10, 12 and 18 are connected to the data storage unit 40 using a data storage network 32.

The data storage network 32 may be a conventional Storage Area Network (SAN), for example, based on any of a variety of technologies, including possibly Fibre Channel technology or SCSI technology. An important advantage to using a SAN or similar data storage network 32 is that the entire interface between the servers 10, 12 and 18 and the data storage unit 40 may be made very reliable. First, the data storage network 32 may be configured with redundant data paths between each of the servers 10, 12 and 18 and the data storage unit 40. Thus, for example, the data storage network 32 may comprise at least a first path and a second path between the first server 10 and the data storage unit 40. Either the first path or the second path may be used to transfer data between the server 10 and the data storage unit 40. Next, the system may be set up with failover capabilities, so that, if there is a failure in one data path between a server 10, 12 and 18 and the data storage unit 40, the system may switch over and use another, redundant data path. Thus, for example, when there is a first data path and a second data path between the first server 10 and the data storage unit 40, and there is a failure along the first path preventing its use, the system can switch over and use the second data path to maintain a connection between the server 10 and the data storage unit 40.

It is often advantageous to have a fully redundant data storage network 32, so that no single failure can prevent any of the servers 10, 12 and 18 from accessing their data on the data storage unit 40. One requirement of a fully redundant data storage network 32 is that each server 10, 12 and 18 must have at least two interface cards for interfacing with the data storage network. Otherwise, if a server only has a single interface card and a failure on that card prevents its use for accessing the data storage network 32, then the respective server 10, 12 or 18 is prevented from accessing the data storage unit 40. Thus, each of the servers 10, 12 and 18 in FIG. 1B is shown as having a pair of data interface cards. Specifically, the server 10 includes a first data interface card 10C and a second data interface card 10D, the server 12 includes a first data interface card 12C and a second data interface card 12D, and the server 18 includes a first data interface card 18C and a second data interface card 18D. Each of the data interface cards 10C, 10D, 12C, 12D, 18C and 18D may be a conventional data interface card for interfacing with the data storage network 32. For example, if the data storage network 32 is a Fibre Channel network, then the data interface cards 10C, 10D, 12C, 12D, 18C and 18D may be Fibre Channel host bus adapter cards (HBAs).

Each of the servers 10, 12 and 18 may use the data storage network 32 to access the file system 41 in the data storage unit 40. Each of the servers 10, 12 and 18 may have full access to the file system 41, including mounting the file system, reading and modifying configuration data for the file system, and reading and writing file data within the file system. Without more, however, the file system 41 would likely become corrupted, as described above. Thus, a distributed file system such as the one illustrated in FIG. 1B must place restrictions on the ability of the servers 10, 12 and 18 to access the file system 41.

Existing distributed file systems use the exchange of locking information to restrict access to the file system. A few examples of such distributed file systems are the Frangipani file system that was created by the Digital Equipment Corporation, the xFS file system that was created by the University of California at Berkeley, and the Veritas cluster file system, developed by the Veritas Software Corporation. These distributed file systems require that the servers 10, 12 and 18 exchange locking information to ensure that they do not access the file system 41 in conflicting manners. For example, a first file in the file system 41 may have a first lock associated therewith. One of the servers 10, 12 and 18 may be designated as a master server with respect to this first lock. Thus, suppose the server 12 is designated as the master server with respect to the first lock and that the server 10 desires to access the first file. The server 10 must communicate with the server 12 and request the first lock. The server 12 must then communicate with the server 10 to grant it the first lock before the server 10 may access the first file. Thus, for such a distributed file system to work, there must be some means of communication between the servers 10, 12, and 18.

Although the data storage network 32 enables the servers 10, 12 and 18 to interface with the data storage unit 40, such networks typically do not enable the servers 10, 12 and 18 to interface with each other. Thus, computer systems that use a distributed file system such as the one illustrated in FIG. 1B typically also include a separate network that may be used by the servers 10, 12, and 18 to communicate with each other. FIG. 1B shows a separate LAN 20 that is generally used for this purpose. Thus, in the example described above, the server 10 may send a network packet to the server 12 using the LAN 20, requesting the first lock, so that it may access the first file. The server 12 may then send another network packet back to the server 10 granting it the first lock, and thereby granting it access to the first file.

In the system of FIG. 1B, the LAN 20 is used to enable the servers 10, 12 and 18 to communicate with each other to gain access to the data storage unit 40. The LAN 20 is essential to the servers 10, 12 and 18 gaining access to the data storage unit 40. As a result, the reliability of the servers' access to the data storage unit 40 is dependent on the reliability of the LAN 20. Put simply, if a server 10, 12 or 18 cannot access the LAN 20 to obtain a lock for using the file system 41, it doesn't matter how reliable the data storage network 32 is. Thus, to improve the reliability of data access for the servers 10, 12 and 18, redundant paths are preferably also provided for enabling the servers 10, 12 and 18 to interface with each other over the LAN 20. In particular, each of the servers 10, 12 and 18 is preferably provided with two network interface cards (NICs) for connecting to the LAN 20. Otherwise, with just a single NIC, a failure in that NIC could prevent the respective server from obtaining a lock required to access its data in the data storage unit 40. Thus, the server 10 includes a first NIC 10A and a second NIC 10B, the server 12 includes a first NIC 12A and a second NIC 12B, and the server 18 includes a first NIC 18A and a second NIC 18B. Now, for example, if the first NIC 10A fails, the server 10 may still interface with the LAN 20 using the second NIC 10B.

In many situations, a system such as the system of FIG. 1B is not desirable for various reasons. First, it may not be desirable to require a second network such as the LAN 20 to enable the servers 10, 12 and 18 to communicate with each other to access the data storage unit 40. Even if each of the servers 10, 12 and 18 is connected to some other computer network, it may not be desirable to ensure that they are all connected to the same computer network. Second, it may not be desirable to provide each server 10, 12 and 18 with a pair of NICs just to provide full redundancy for their access to the data storage unit 40. Third, configuring a system such as the system of FIG. 1B can be complicated and time-consuming. Each of the servers 10, 12 and 18 must be provided with a substantial amount of information, such as which servers 10, 12 and 18 are permitted to access the file system 41 and individual data entities within the file system 41, which server is to function as the master server for each lock, and the IP (Internet Protocol) addresses or other addresses for each of the other servers. Finally, a system such as the one illustrated in FIG. 1B typically must also employ a complex re-mastering technique that is used whenever a master server of a lock fails, to ensure that another server can become the master server, so that the remaining servers may still access the data entity secured by the lock.

What is needed is a distributed file system that enables multiple computing entities to have concurrent access to a data storage unit, without having to go through a file server, and without all of the complexity, expense and inefficiencies of existing distributed file systems.

SUMMARY OF THE INVENTION

The invention comprises a method for attempting to access a first data entity in a file system, the file system also including one or more additional data entities that are concurrently accessible to at least one other computing entity, the file system including an owner field for indicating if the first data entity is leased by a computing entity and a time field for indicating whether a lease for the first data entity has expired. The method comprises: attempting to obtain a lease on the first data entity by performing the following substeps: (a) reserving a data storage unit containing the owner field, (b) if the owner field indicates that the first data entity is not currently leased, writing to the owner field to indicate an assumption of a lease and writing to the time field to indicate when the lease expires, (c) if the owner field indicates that the first data entity has been leased, and the time field indicates that the lease is active, writing to the owner field in a queue to indicate an intention to lease and writing to the time field to indicate when the lease expires, and (d) if the owner field indicates that the first data entity has been leased, but the time field indicates that the lease has expired, writing to the owner field to break the existing lease and to indicate an assumption of a new lease and writing to the time field to indicate when the new lease expires; and if a lease is obtained, accessing the first data entity while the lease is in effect.

DETAILED DESCRIPTION

Figure 1A:
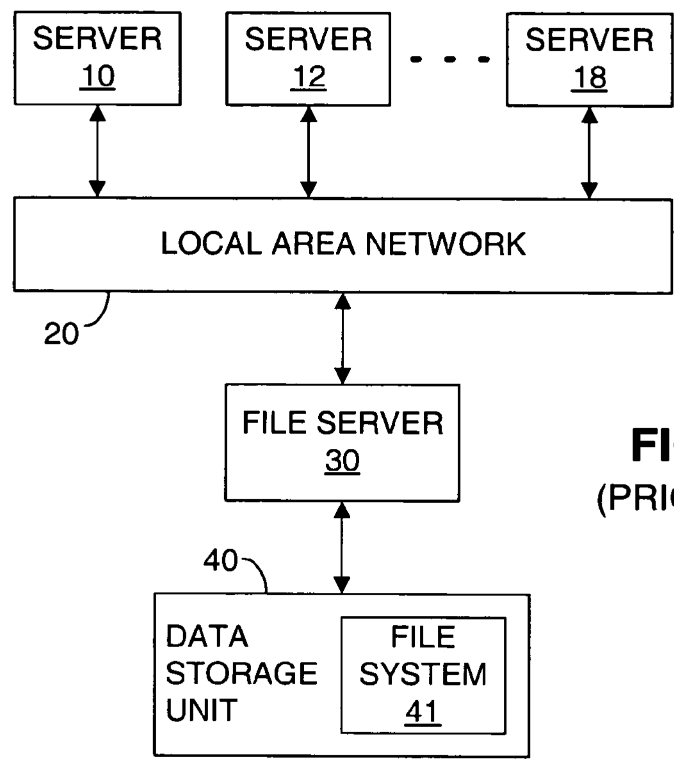
FIG. 1A illustrates a first prior art system for providing multiple servers with access to a data storage unit.
Figure 1B:
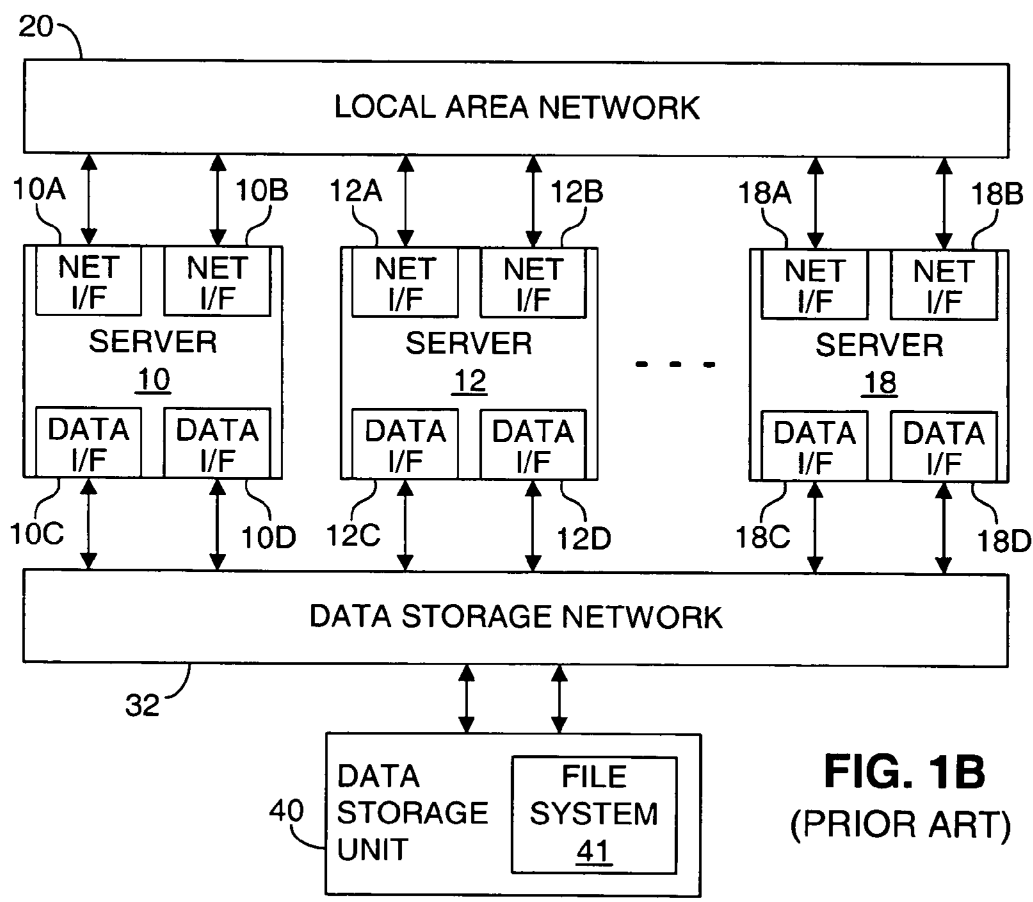
FIG. 1B illustrates a second prior art system for providing multiple servers with access to a data storage unit.
Figure 2:
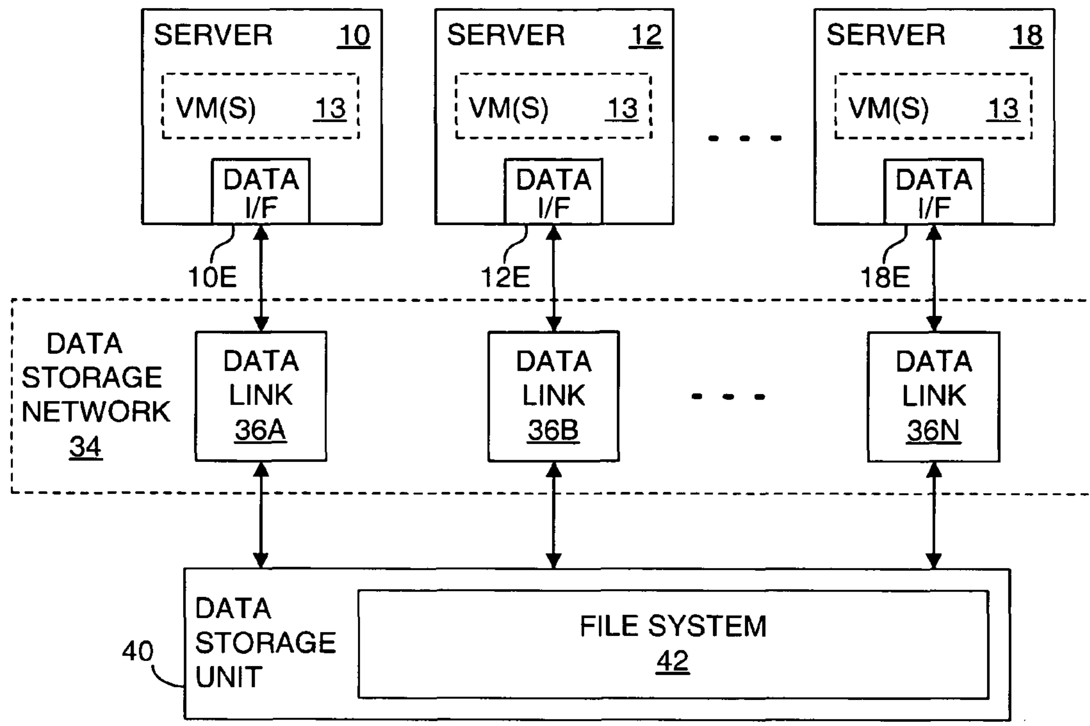
FIG. 2 illustrates a system in which this invention may be implemented to provide multiple servers with concurrent access to a file system within a data storage unit.

This invention may be implemented in any system in which it is advantageous for multiple computers or other computing entities to have concurrent access to a common file system. A typical situation in which the invention may be implemented involves multiple computers being connected in some manner to a data storage unit that contains a file system. FIG. 2 illustrates one such computer system in which the invention may be implemented. The system of FIG. 2 includes the servers 10, 12 . . . 18 and the data storage unit 40 of FIGS. 1A and 1B. The data storage unit 40 includes a file system 42, which may generally be the same as the file system 41, except for the addition of certain specific locking information that is described below.

Each of the servers 10, 12 and 18 is connected to the data storage unit 40 in some manner. These connections are illustrated in FIG. 2 as general data links 36. Thus, the server 10 is connected to the data storage unit 40 by a data link 36A, the server 12 is connected to the data storage unit 40 by a data link 36B, and the server 18 is connected to the data storage unit 40 by a data link 36N. Each of the data links 36A, 36B and 36N may be any type of data link that permits the transfer of data between the respective servers 10, 12 and 18, and the data storage unit 40. The data links 36A, 36B and 36N may be part of a data storage network 34, which may be substantially the same as the data network 32 shown in FIGS. 1A and 1B. For example, the data storage network 34 may comprise a conventional SAN.

The server 10 is connected to the data link 36A by a data interface 10E, the server 12 is connected to the data link 36B by a data interface 12E, and the server 18 is connected to the data link 36C by a data interface 18E. The data interfaces 10E, 12E and 18E may be the same as the data interfaces 10C, 10D, 12C, 12D, 18C and 18D. For example, if the data links 36A, 36B and 36N are part of a Fibre Channel SAN, then the data interfaces 10E, 12E and 18E may comprise Fibre Channel HBAs. Each of the servers 10, 12 and 18 may also contain a second data interface, as illustrated in FIGS. 1A and 1B. A single data interface is shown in each of the servers 10, 12 and 18 in FIG. 2 for generality.

As one example configuration for the system of FIG. 2, the servers 10, 12 and 18 may be conventional server computers, as described above; the data links 36A, 36B and 36N may be part of a conventional Fibre Channel SAN and the data interfaces 10E, 12E and 18E may be conventional Fibre Channel HBAs; and the data storage unit 40 may be a conventional storage system, containing a generally conventional file system 42. The data storage unit 40 must implement some temporary locking mechanism, however. For example, the data storage unit 40 may implement disk reserve and release primitives, such as those provided by a SCSI interface. The only aspects of the system of FIG. 2 that must be unique in order to implement this invention are some software routines on the servers 10, 12 and 18 for implementing some methods described below and some data fields within the file system 42, which are also described below.

FIG. 2 also shows that the servers 10, 12 and 18 may each include one or more VMs 13. Various techniques for implementing VMs are known in the art, and any such technique may be used to implement the VMs 13. VMware, Inc., the assignee of this application, sells several commercial products that embody various techniques that may be used to implement the VMs 13. U.S. patent application Ser. No. 10/319,217 (the "217 application"), entitled "Virtual Machine Migration", which is incorporated here by reference, describes an implementation that may be used for the VMs 13. As mentioned above and as described in greater detail below, this invention may be particularly advantageous when implemented in computer systems in which multiple VMs, such as the VMs 13, execute on multiple servers, such as the servers 10, 12 and 18, and share a common file system, such as the file system 42.

Figure 3:
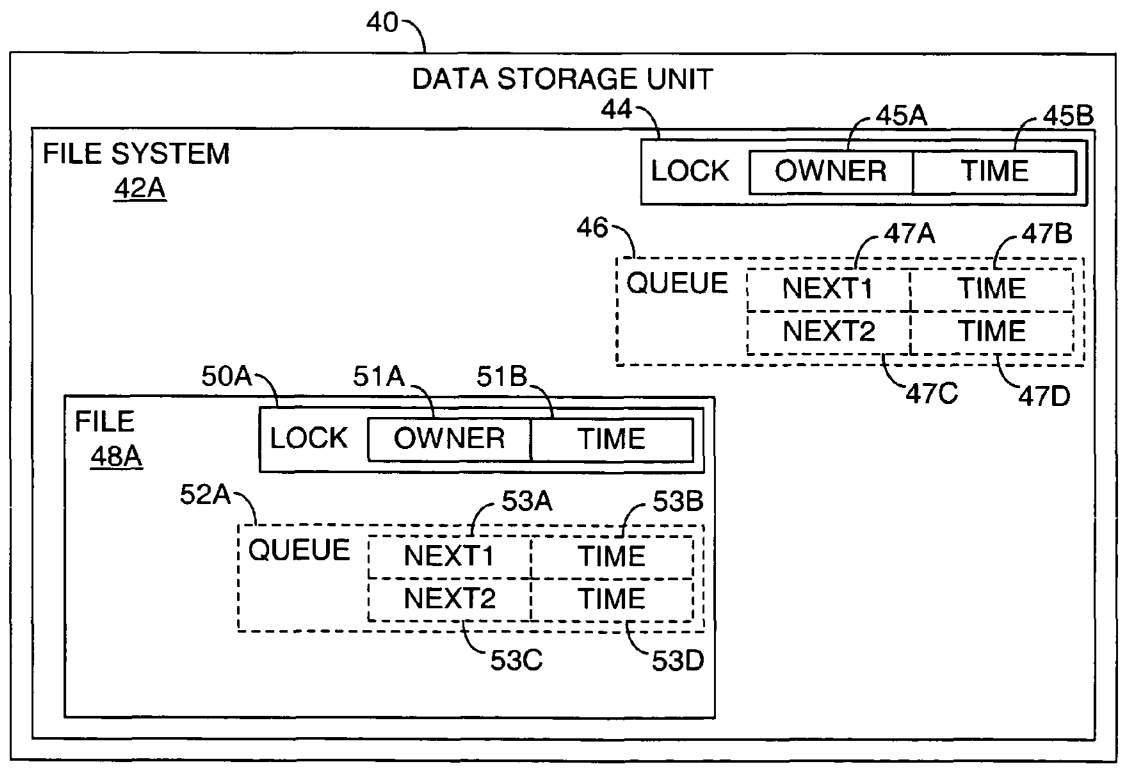
FIG. 3 illustrates a first configuration for locking data that may be used in this invention to enable multiple servers to access a file system concurrently.

Turning now to FIG. 3, the data storage unit 40 is shown, including the file system 42A. The file system 42A may comprise a conventional file system, including a plurality of files of various types, typically organized into one or more directories. The file system 42A may include metadata that specifies information about the file system, such as some data structure that indicates which data blocks in the file system remain available for use, along with other metadata indicating the directories and files in the file system, along with their location. Each file and directory typically also has metadata associated therewith, specifying various things, such as the data blocks that constitute the file or directory, the date of creation of the file or directory, etc. The content and format of this metadata, for the file system and for the individual files and directories, varies substantially between different file systems. Many existing file systems are amply documented so that they can be used and modified as described herein by a person of skill in the art, and any such file system may be used in implementing the invention.

To implement the invention, various additional data fields of metadata are preferably added to the file system 42A, such as a plurality of fields that are shown in FIG. 3. First, the file system 42A includes a file system lock 44, which includes an owner data field 45A and a time data field 45B. The owner data field 45A may be a unit of data, such as a byte, a word, etc., that is used to identify a computing entity that owns or possesses the lock 44. Possessing the lock 44 gives a computing entity exclusive access to the configuration data of the file system 42A. The owner data field 45A may contain a zero or some other special value to indicate that no computing entity currently owns the lock, or it may contain an identification (ID) value of one of the computing entities to indicate that the respective computing entity currently owns the lock. For example, each of the servers 10, 12 and 18 may be assigned a unique ID value, which could be inserted into the owner field 45A to indicate that the respective server owns the lock 44 for the file system 42A. A unique ID value need not be assigned manually by a system administrator, or in some other centralized manner. Instead the ID values may be determined for each of the servers 10, 12 and 18 in a simpler, more automated manner, such as by using the server's IP address or the MAC (Media Access Control) address of the server's network interface card, by using the World Wide Name (WWN) of the server's first HBA or by using a Universally Unique Identifier (UUID). For the rest of this description, it will be assumed that a zero is used to indicate that a lock is not currently owned, although other values may also be used for this purpose.

In the preferred embodiment, locks, such as the lock 44, are owned or possessed by computing entities on a renewable-lease basis. Thus, when a computing entity obtains a lock, it preferably owns the lock for a specified period of time. The computing entity may extend the period of ownership, or the lease period, by renewing the lease. Once the lease period ends, another computing entity may take possession of the lock. The time field 45B indicates, in some manner, whether or not the current lease has expired. In the preferred embodiment, each lease is for a predetermined period of time, and the time field 45B preferably stores a time value that indicates the time at which the current lease period began. This time value may take the form of a conventional time stamp value, or it may take some other form, such as a real time value that is used in common by multiple computing entities. The time at which the current lease expires can then be calculated by adding the lease period to the value in the time field 45B. As another alternative, the time field 45B may contain a value that does not represent time at all. For example, the time field 45B may contain some value that is incremented whenever a computing entity renews a lease or it may even include an arbitrary value, so long as the value is modified each time a lease is renewed. The remainder of this description will assume that the time field 45A and other time fields contain time values, such as time stamps. When the owner field 45A contains a zero, the value in the time field 45B is irrelevant.

The file system 42A also includes one or more other data entities. A data entity may be a file, a directory or the file system 42A itself. Each such data entity has its own lock, similar to the lock 44 shown for the file system 42A. To gain access to one of these data entities, a computing entity must gain control of the respective lock. Thus, to change the configuration data of the file system 42A, such as by adding a new directory, a computing entity must become the owner of the lock 44; to change the configuration data of a directory within the file system 42A, such as by adding a new sub-directory, a computing entity must become the owner of the lock that controls the respective directory; and to change the data in a file within the file system 42A, a computing entity must become the owner of the lock that controls the respective file. Also, just to read the data in any such data entity, a computing entity must become the owner of the lock that controls the respective data entity. An exception to this, however, is that a computing entity generally has both read and write access to the locking metadata described herein for any of the data entities, even if another computing entity controls the lock for such data entity. FIG. 3 shows a file 48A as one such other data entity. The file 48A includes a lock 50A, which further comprises an owner data field 51A and a time data field 51B. The owner field 51A may be substantially the same as the owner field 45A, although with different contents, and the time field 51B may be substantially the same as the time field 45B, although again with different contents.

As an option, in addition to the lock 44, the file system 42A may also include a queue 46, which is shown in dashed lines in FIG. 3 to indicate that it is optional. The queue 46 may include one or more next owner data fields that are similar to the owner data field 45A. FIG. 3 shows two such optional next owner data fields, namely a next1 47A and a next2 47C. These next owner data fields form a queue to indicate computing entities that are waiting to obtain the lock 44. Thus, if the server 10 currently owns the lock 44, with the owner field 45A containing the ID value of the server 10, the next1 data field 47A may contain the ID value of the server 12, indicating that the server 12 is entitled to obtain the lock 44 after the server 10 is finished with it. Similarly, the next2 data field 47C may contain the ID value of the server 18, indicating that the server 18 is entitled to obtain the lock 44 after both the servers 10 and 12 are finished with it. The queue 46 may also include a time value 47B for indicating when an ID value was inserted into the next1 field 47A and a time value 47D for indicating when an ID value was inserted into the next2 field 47C.

Similarly, the file 48A may include a queue 52A that is substantially the same as the queue 46, with a next1 data field 53A that is substantially the same as the next1 data field 47A, a next2 data field 53C that is substantially the same as the next2 data field 47C, a time data field 53B that is substantially the same as the time data field 47B, and a time data field 53D that is substantially the same as the time data field 47D. The optional queue 52A provides a queue for the lock 50A in the same manner that the optional queue 46 provides a queue for the lock 44. Either the queue 46 or the queue 52A may contain a larger or smaller number of queue entries than illustrated in FIG. 3. Each of the data entities within the file system 42A, including the file system 42A itself and each of the directories and files in the file system, includes a lock, such as the lock 50A, and possibly a queue, such as the queue 52A.

Figure 4:
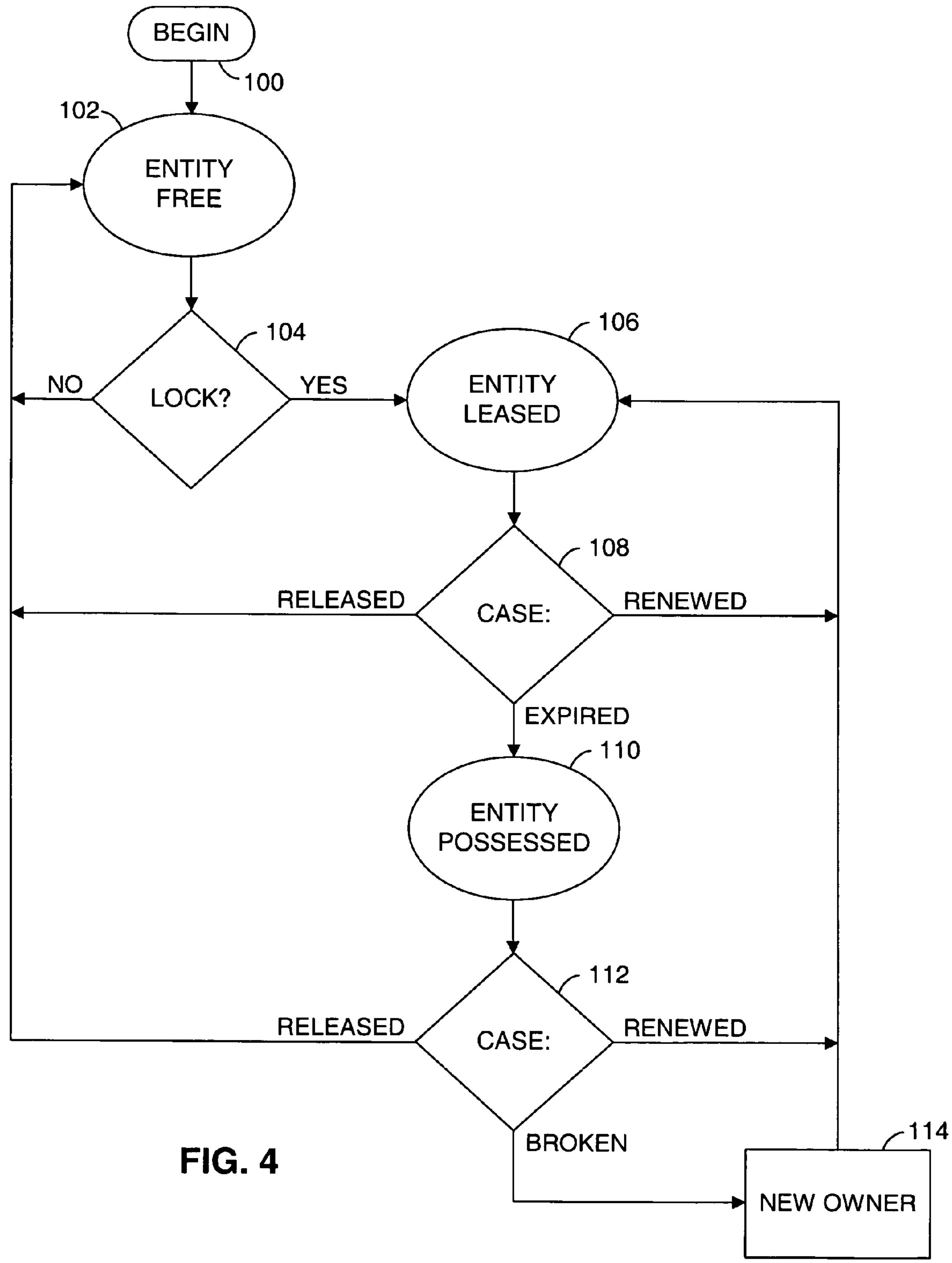
FIG. 4 is a state diagram illustrating multiple states of availability through which a data entity transitions when this invention is implemented.

Each of the locks for the data entities within the file system 42A may transition between three different possible states. FIG. 4 is a state diagram that illustrates these possible states and the possible transitions between the states. In describing the state diagram of FIG. 4, reference is made to the file 48A of FIG. 3, including the lock 50A, further including the owner field 51A and the time field 51B. The diagram of FIG. 4 begins at an initial step 100, which leads to a first state 102. In this first state 102, the data entity (or the lock controlling the data entity) is free or available. Thus, at this point in the state diagram of FIG. 4, the lock 50A is free, and no computing entity is currently entitled to access the file 48A. Thus, the owner field 51A contains a zero, indicating that the lock 50A is available.

From the free state 102, the state diagram of FIG. 4 proceeds to a decision step 104. At this step, a computing entity may claim ownership of the lock 50A by writing its ID value into the owner field 51A. Thus, for example, the server 10 may write its ID value into the owner field 51A. If a computing entity does claim ownership of the lock 50A, the data entity transitions to a leased state 106. If ownership of the lock is not claimed by a computing entity at the decision step 104, the data entity remains in the free state 102. At the leased state 106, a computing entity has signed up for a renewable lease period by writing its ID value into the owner field 51A and by inserting a time value into the time field 51B. Now, the computing entity is entitled to use the file 48A until the lease expires, and other computing entities are not entitled to use the file 48A. In the preferred embodiment, a lease expires after a predetermined period of time, unless it is either renewed or released prior to the expiration.

From the leased state 106, the state diagram proceeds to a decision step 108. At this step, the computing entity that currently owns the lock 50A may either release the lock, enabling another computing entity to gain control of the lock, or it may renew the lease to ensure that it may continue using the file 48A. The lock can be released by writing a zero to the owner field 51A. In this case, the state of the file 48A returns to the free state 102 of the state diagram. The lease can be renewed by writing a new time value to the time field 51B. In this case, the state of the file 48A remains in the leased state 106, until the extended lease period expires.

If, at the decision step 108, the lock is not released and the lease is not renewed before the lease period runs out, then the lease expires. In this case, the file 48A transitions to a possessed state 110. Here, the owner field 51A still contains the ID value of the computing entity that last leased the file 48A and the time field 51B still contains the time value from the last time the computing entity leased the file 48A or the last time the computing entity renewed a previous lease. At this point, the computing entity identified in the owner field 51A still has exclusive access to the file 48A. However, the lease of the file 48A is now vulnerable to being broken by another computing entity.

From the possessed state 110, the state diagram proceeds to a decision step 112. At this step, the computing entity that currently possesses the lock 50A may still release the lock or it may still renew the previous lease on the lock. Again, the lock can be released by writing a zero to the owner field 51A, or the lease can be renewed by writing a new time value to the time field 51B. If the lock is released, the state of the file 48A again returns to the free state 102, while, if the lease is renewed, the state of the file 48A returns to the leased state 106.

If the file 48A is in the possessed state 110, another computing entity may break the lease of the previous lessee and gain control of the file 48A by writing its own ID value into the owner field 51A before the lock is released or the lease is renewed by the previous lessee. In this case, the state diagram proceeds to a step 114. At the step 114, the other computing entity may claim control of the lock 50A by writing its own ID value into the owner field 51A and inserting a new time value into the time field 51B. At this point, the state diagram returns to the leased state 106, but with a new lessee.

Each of the data entities within the file system 42A, including all files, all directories and the file system 42A itself, continues to transition between the free state 102, the leased state 106 and the possessed state 110 according to the state diagram of FIG. 4.

Figure 5A:
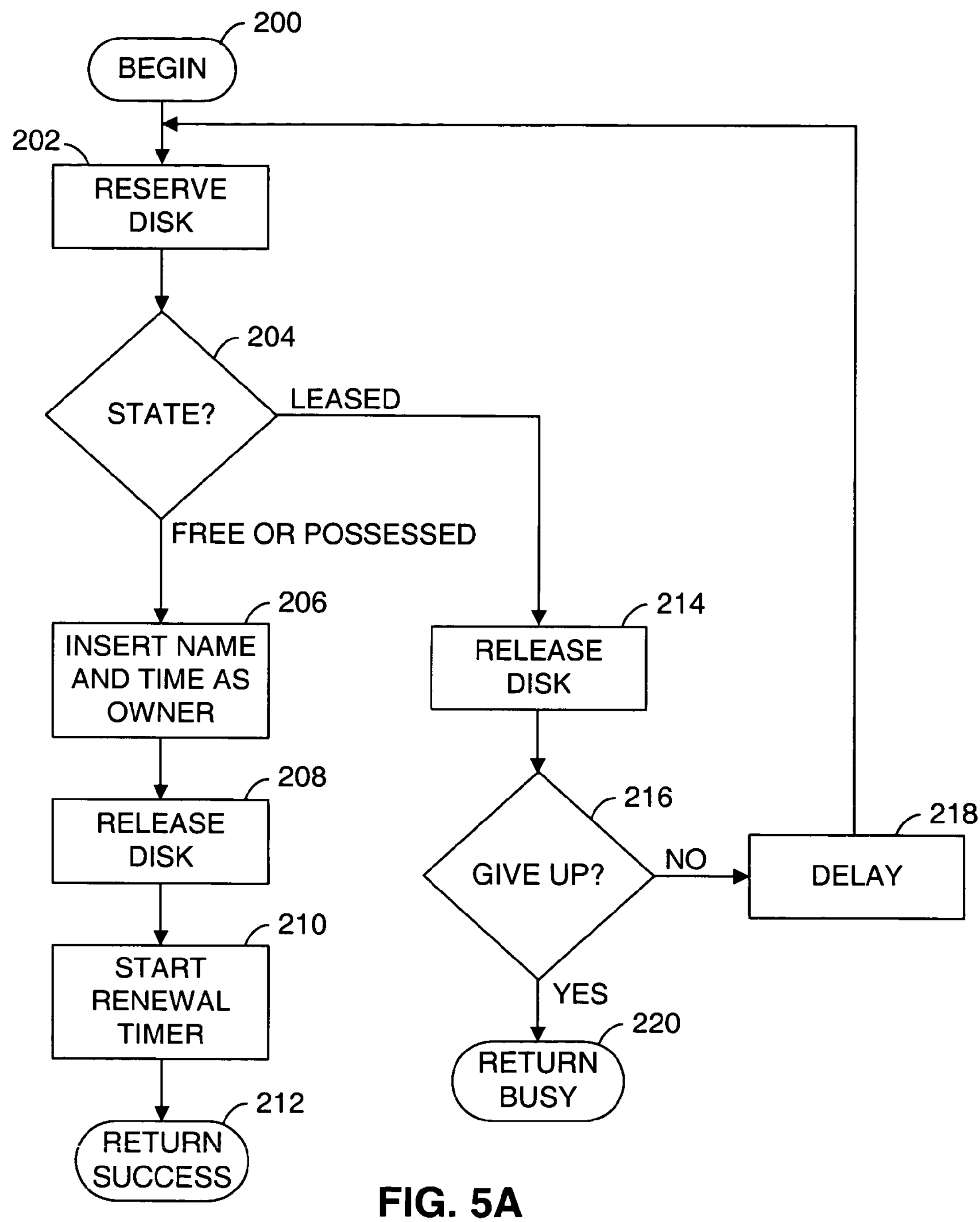
FIG. 5A is a flow chart illustrating a method that is used in a first embodiment of this invention for attempting to obtain a lock on a data entity.

Now, suppose a computing entity is operating, and it determines that it needs to access a data entity within the file system 42A. FIG. 5A is a flow chart illustrating a method that may be used, according to a first embodiment of the invention, to attempt to gain control of a lock within the file system 42A. The following description is made in terms of the server 10, the file 48A and the lock 50A, although it also applies to other computing entities and other data entities, along with their corresponding locks. Thus, suppose the server 10 is operating and it determines that it needs to access the file 48A. FIG. 5A illustrates a method that may be used to attempt to gain control of the lock 50A.

The method of FIG. 5A begins at an initial step 200. Next, at a step 202, the server 10 reserves a data storage device or system that contains the lock 50A. This reservation may take any of a variety of forms. In the preferred embodiment, the data storage unit 40 implements a conventional SCSI reservation system, by which the entire data storage unit 40 may be reserved. As is well known, under such a SCSI reservation system, the entire data storage unit 40 is locked for the exclusive use of the server 10 for as long as the SCSI reservation is in effect, from the time the server 10 issues a disk reserve primitive to the time the server 10 issues a disk release primitive, or until a reset occurs. In other embodiments of the invention, the SCSI reservation system may be used to reserve only a portion of the data storage unit 40. In still other embodiments of the invention, the entire data storage unit 40 or some portion of the data storage unit 40 may be reserved using some other temporary locking mechanism. For this description, suppose the entire data storage unit 40 is reserved using the SCSI reservation system. If the server 10 is unable to reserve the data storage unit 40 because it has already been reserved by another computing entity, the server 10 generally delays a certain period of time and then makes another attempt to reserve the data storage unit 40, until the server 10 is successful. At some point, however, the server 10 may give up on trying to reserve the data storage unit 40, and return from the method with a failure condition. This approach of attempting multiple times to reserve the data storage unit 40 in the event that it is already reserved is also used in the other methods described in this application.

Next, the method of FIG. 5A proceeds to a decision step 204. At this step, the server 10 reads the owner field 51A and possibly the time field 51B to determine the state of the file 48A. The server 10 can read both the owner field 51A and the time field 51B at the same time, and only use the value from the time field 51B if necessary, or the server 10 can read the owner field 51A now and read the time field 51B later, only if necessary. If the owner field 51A contains a zero, then the server 10 concludes that the file 48A is in the free state 102. If the owner field 51A contains an ID value for another computing entity, then the server 10 must determine whether a previous lease to this other computing entity has expired, to determine whether the file 48A is in the leased state 106 or the possessed state 110. In many embodiments, the computing entity may not know of the ID values of all other computing entities. In such a case, the computing entity will preferably take any value other than zero to be the ID value of another computing entity.

The determination of whether a previous lease has expired may be accomplished in at least two different ways. A first method may be used if the server 10 can trust the time values of other computing entities to accurately correlate with its own time values. A second method may be used if there may be a substantial discrepancy between the time values of the multiple computing entities, or if values other than time values are used in the time fields.

According to the first method, the server 10 reads the time value from the time field 51B. The server 10 then adds the lease period to this time value to compute the expiration time of the prior lease. The server 10 then compares the lease expiration time with the current time to determine if the lease has expired.

In the second method for determining whether the prior lease has expired, the server 10 also reads the time value from the time field 51B. The server 10 then releases the SCSI reservation that was made at the step 202 and then delays for an entire lease period, with the lease period being measured according to its own timing mechanisms. After the lease period expires, the server 10 again reserves the data storage unit 40 using the SCSI reservation system and again checks the time value in the time field 51B. If the time value in the time field 51B has changed between the first reading and the second reading, then the server 10 concludes that the prior lease has not expired, while, if there was no change in the time field 51B, the server 10 concludes that the prior lease has expired. A change in the time field 51B in this situation typically means that the prior lease has been renewed by the previous lessee, although it can also mean that the prior lease was broken by another computing entity. The server 10 may also double-check the owner field 51A at this point, although it should contain the ID value of some other computing entity. If, by chance, the owner field 51A contains a zero at this point, the server 10 may conclude that the lock 50A is free.

Returning now to the decision step 204, if the server 10 determines that the file 48A has been leased to another computing entity and that this lease has not expired, then the server 10 concludes that the file 48A is currently in the leased state 106. In this case, the method of FIG. 5A proceeds to a step 214. If the server 10 determines that the file 48A has been leased to another computing entity, but that the prior lease has expired, then the server 10 concludes that the file 48A is currently in the possessed state 110. In this case, the method of FIG. 5A proceeds to a step 206. If the server 10 concludes that the file 48A is in the free state 102 based on the value in the owner field 51A, then the method also proceeds to the step 206.

At the step 206, the server 10 claims control of the lock 50A by writing its own ID value into the owner field 51A and by writing a new time value into the time field 51B. The server 10 now has exclusive access to the file 48A for a renewable lease period, beginning at this point in time. Next, the method proceeds to a step 208. At the step 208, the server 10 releases the SCSI reservation so that other computing entities may again access the data storage unit 40, although the other computing entities are not entitled to use the file 48A.

Next, at a step 210, the server 10 begins a renewal timer that is set to track the time of a lease period. When the renewal timer goes off, the server 10 may renew the current lease if the server is still using the file 48A, so that the lease does not expire. After the step 210, the method terminates at a step 212, with a successful acquisition of the lock 50A.

At the step 214, the server 10 also releases the SCSI reservation, but in this case the server 10 has not written its ID value into the owner field 51A to claim control of the lock 50A. At this point, the server 10 is precluded from accessing the file 48A because another computing entity has control of the lock 50A.

Next, the method proceeds to a step 216. Here, the server 10 must decide whether or not to give up on obtaining control of the lock 50A. In one embodiment, the server 10 implements the second method described above for determining whether a prior lease has expired and, if the server 10 concludes that the prior lease is still valid, generally indicating that the lessee of the prior lease has renewed its lease, then the server 10 gives up on obtaining the lock immediately upon reaching the step 216. In other embodiments, the server 10 may attempt to obtain the lock a number of times before giving up. If the server 10 does not give up on obtaining the lock 50A at the step 216, then the method proceeds to a step 218. At the step 218, the server 10 delays a period of time before returning to the step 202 to try again to obtain the lock 50A. If the server 10 does give up on obtaining the lock 50A, the method proceeds to a terminal step 220. At this point, the server 10 returns to another software routine, reporting that the file 48A is not currently available.

Figure 5B:
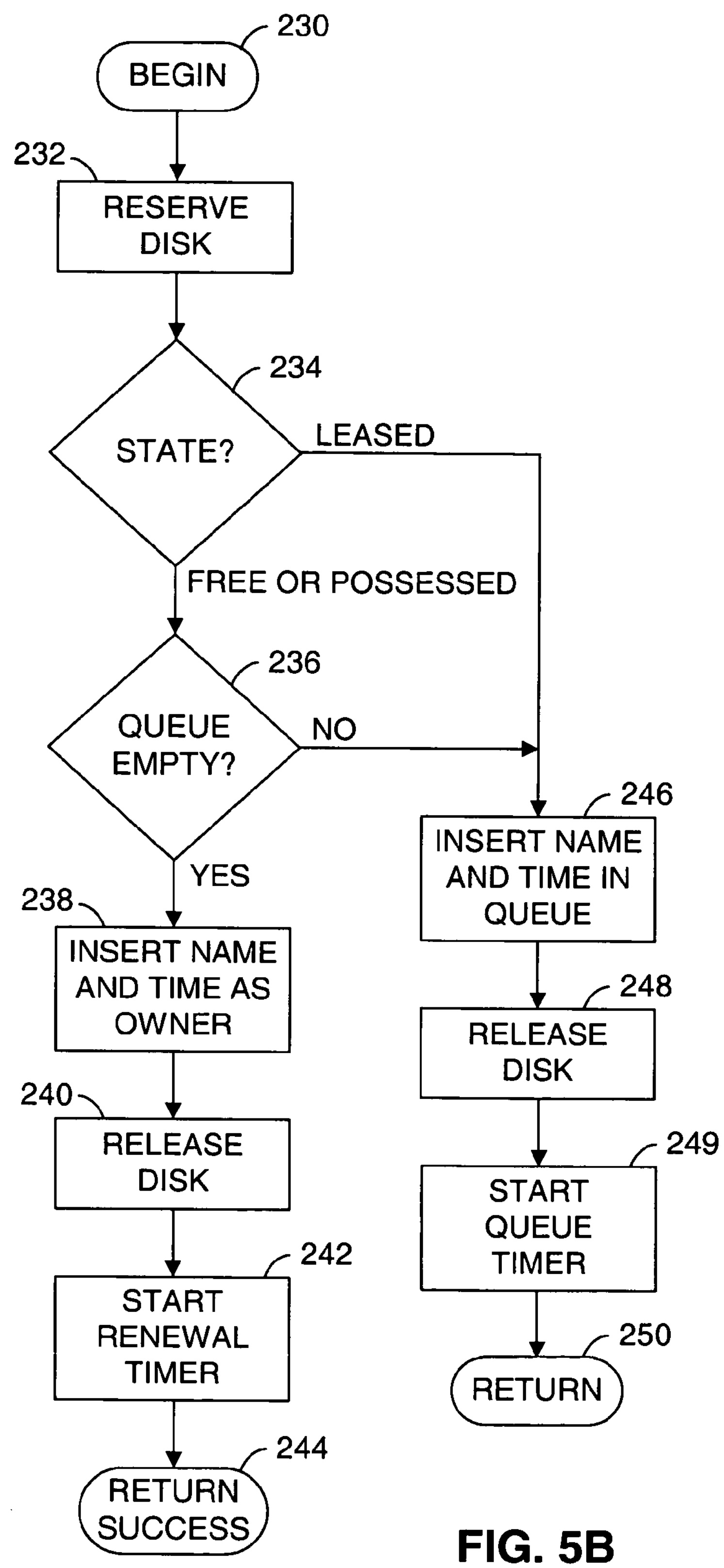
FIG. 5B is a flow chart illustrating a method that is used in a second embodiment of this invention for attempting to obtain a lock on a data entity.

FIG. 5B is a flow chart illustrating a method that may be used, according to a second embodiment of the invention, to attempt to gain control of a lock within the file system 42A. This second embodiment of the invention involves the use of optional queues, such as the queues 46 and 52A shown in FIG. 3. The use of queues, such as the queues 46 and 52A generally promotes fairness between the computing entities with respect to their ability to gain access to data entities. Without the use of queues, the ability of the different computing entities to gain control of a lock is dependent on the timing of their respective attempts to gain control of the lock and the time at which the lock becomes available. One computing entity may be able to gain control of a lock instead of another computing entity that has been waiting longer, simply because its timing was better relative to the time that the lock became available. In contrast, the use of queues helps to ensure that computing entities that have been waiting longer may gain control of a lock before computing entities that have been waiting for a shorter period of time.

Again, the following description is made in terms of the server 10, the file 48A and the lock 50A, although it also applies to other computing entities and other data entities, along with their corresponding locks. Thus, suppose the server 10 is operating and it determines that it needs to access the file 48A. FIG. 5B illustrates a second method that may be used to attempt to gain control of the lock 50A.

The method of FIG. 5B begins at an initial step 230. Next, at a step 232, the server 10 reserves the data storage unit 40, such as by using a SCSI reservation system. Next, the method of FIG. 5B proceeds to a decision step 234. This step 234 is performed in the same manner as the step 204 of FIG. 5A to determine whether the file 48A is in the free state 102, the leased state 106 or the possessed state 110. If the server 10 concludes that the file 48A is in the leased state 106, the method proceeds to a step 246. If the server 10 concludes that the file 48A is in either the free state or the possessed state, then the method proceeds to a step 236.

At the step 236, the server 10 determines whether the queue 52A is empty, or, more precisely, whether the queue 52A has any valid entries. In this example, the queue 52A consists of a first entry, represented by the next1 field 53A and the time field 53B, and a second entry, represented by the next2 field 53C and the time field 53D. First, the server 10 reads the value from the next1 field 53A. The server 10 may also read the values from the next2 field 53C and from the time fields 53B and 53D at this point, for efficiency, although these additional values may not be needed. If the next1 field 53A contains a zero, then the queue 52A is empty, and the method proceeds to a step 238. If the next1 field 53A contains the ID value of another computing entity, then the other computing entity owns the first entry in the queue 52A. Next, however, the server 10 checks to see if this queue entry is still valid by reading the time value in the time field 53B. This determination of whether a queue entry remains valid may be performed using the same methods that are used to determine if a lease has expired. The amount of time for which a queue entry remains valid may be the same as the lease period, or it may be different. If the queue entry is no longer valid, then the server 10 moves on to check the second entry in the queue 52A by reading the next2 field 53C and then possibly the time field 53D. If the next2 field 53C contains a zero, then the second entry in the queue 52A is empty. Otherwise, the time field 53D is used in the same manner to determine if the second queue entry remains valid. If both entries in the queue 52A are either empty or invalid, then the server 10 concludes that the queue 52A is empty and the method proceeds to the step 238. If either of the entries in the queue 52A contains a valid, nonzero entry, then the server 10 concludes that the queue 52A is not empty and the method proceeds to a step 246.

At the step 238, the server 10 claims control of the lock 50A by writing its own ID value into the owner field 51A and by writing a new time value into the time field 51B. The server 10 now has exclusive access to the file 48A for a renewable lease period, beginning at this point in time. Next, the method proceeds to a step 240. At this step, the server 10 releases the SCSI reservation so that other computing entities may again access the data storage unit 40. Next, at a step 242, the server 10 begins a renewal timer just as described above in connection with the step 210 of FIG. 5A. Next, the method terminates at a step 244, with a successful acquisition of the lock 50A.

At the step 246, the server 10 places its name at the end of the queue 52A, if the queue is not already full. If the next1 field 53A contains a zero, then the first entry in the queue 52A is open, and the server 10 writes its own ID value into the next1 field 53A and a new time value into the time field 53B, to claim the first entry in the queue. If the next1 field 53A contains the ID value of another computing entity, then the first entry in the queue 52A has been taken, and the server 10 must check the validity of both entries in the queue in the same manner as described above. If both the first entry and the second entry are either open or no longer valid, then the server 10 claims the first entry in the queue by writing its own ID value into the next1 field 53A and a new time value into the time field 53B. If the first entry in the queue is no longer valid, but the second entry in the queue is a valid entry, then the server 10 copies the second entry into the first entry and claims the second entry for itself. To copy the second entry of the queue into the first entry, the server 10 copies the value from the next2 field 53C into the next1 field 53A and the server copies the value from the time field 53D into the time field 53B. If the first entry remains valid and the second entry is either open or no longer valid, then the server 10 claims the second entry for itself. The server 10 claims the second entry for itself by writing its own ID value into the next2 field 53C and a new time value into the time field 53D. If both of the entries in the queue 52A contain valid entries, then the queue 52A is full, and the server 10 proceeds without making any change to the queue 52A. After the step 246, the method of FIG. 5B proceeds to a step 248.

At the step 248, the server 10 releases the SCSI reservation, but in this case the server 10 has not written its ID value into the owner field 51A to claim control of the lock 50A. At this point, the server 10 is precluded from accessing the file 48A because another computing entity has control of the lock 50A. Next, the method proceeds to a step 249. At the step 249, the server 10 begins a renewal timer that is set to track the time for which a queue entry remains valid. When the renewal timer goes off, the server 10 may renew the queue entry so that the queue entry remains valid. Next, the method proceeds to a terminal step 250. At this point, the server 10 may return to another software routine, reporting that the file 48A is not currently available.

Figure 5C:
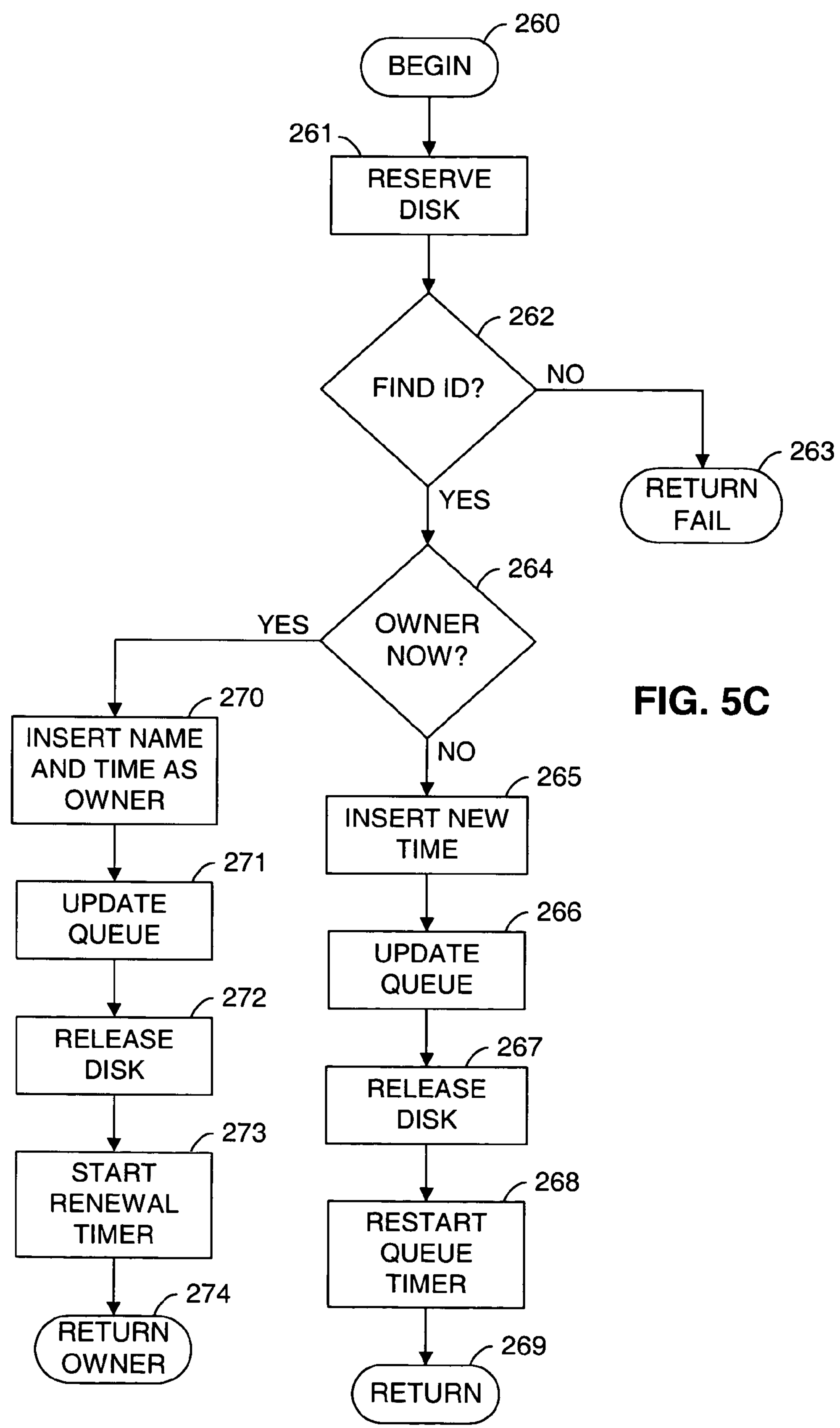
FIG. 5C is a flow chart illustrating a method that is used in the second embodiment of this invention for refreshing a queue.

In this embodiment of the invention, if the server 10 was able to claim an entry in the queue 52A at the step 246, then the server 10 waits until the queue timer goes off, and then the server 10 renews the queue entry according to a method illustrated in FIG. 5C. Also during the method of FIG. 5C, the server 10 checks to see if the lock 50A has become available. If, however, an entry in the queue 52A was not available, the server 10 may delay for a period of time and execute the method of FIG. 5B again until it is either able to gain control of the lock 50A or at least claim an entry in the queue 52A.

In this embodiment, as described below, when a lessee is finished using a data entity, the lessee checks to see whether the queue for the data entity indicates that another computing entity is waiting to use the data entity. If there is a computing entity on the queue for the data entity, then, when the lessee is finished with the data entity, the lessee copies the first valid entry in the queue into the owner field and time field of the lock, so that the computing entity that is next on the queue gains control of the lock. However, this computing entity will not realize that it has gained control of the lock until the next time it goes to renew its queue entry.

Now, FIG. 5C illustrates a method that may be performed by a computing entity to attempt to renew its entry on a queue, such as the queues 46 and 52A. Again, the following description is made in terms of the server 10, the file 48A and the lock 50A, although it also applies to other computing entities and other data entities, along with their corresponding locks.

Thus, suppose the server 10 performed the method of FIG. 5B and placed its ID value into one of the two entries of the queue 52A. Then, when the queue timer goes off, the server 10 may perform the method of FIG. 5C in an attempt to renew its queue entry.

The method of FIG. 5C begins at an initial step 260. Next, at a step 261, the server 10 reserves the data storage unit 40, such as by using a SCSI reservation system. Next, at a step 262, the server 10 determines whether its ID value remains either in the queue 52A or in the owner field 51A. Thus, the server 10 reads the values in the owner field 51A, the next1 field 53A and the next2 field 53C. If the server 10 does not find its ID value in any of these fields, then the method proceeds to a terminal step 263 and the server 10 returns from the method with a failure condition. If the server 10 does find its ID value in one of these fields, then the method of FIG. 5C proceeds to a step 264.

At the step 264, the server 10 determines whether it is now entitled to take control of the lock 50A. The server 10 is entitled to take control of the lock 50A in either of two circumstances. First, if the ID value of the server 10 is found in the owner field 51A, then the server 10 is already the owner of the lock 50A. This situation can arise if the previous lessee copies the ID value of the server 10 from the queue 52A into the owner field 51A when the previous lessee releases control of the lock 50A. The server 10 is also entitled to take control of the lock 50A if the previous lease has expired and if there are no valid entries in the queue 52A that have a higher priority than the queue entry of the server 10. Thus, the server 10 may need to check to see if the prior lease has expired and whether any higher priority queue entries remain valid to determine whether it is entitled to take control of the lock 50A. These determinations may be made in the same manners as described above. If the server 10 determines that it is now entitled to have control of the lock 50A, then the method of FIG. 5C proceeds to a step 270; otherwise, the method proceeds to a step 265.

At the step 265, the server 10 writes a new time value to its entry within the queue 52A. Thus, if the ID value of the server 10 is in the next1 field 53A, then the server 10 writes a new time value to the time field 53B, while, if the ID value of the server 10 is in the next2 field 53C, then the server 10 writes a new time value to the time field 53D. Next, at a step 266, the server 10 updates the queue 52A. Specifically, if the server 10 owns the second entry in the queue 52A, the server 10 checks the validity of the first entry in the queue 52A as described above. If the first entry in the queue 52A is no longer valid, then the server 10 claims the first entry by writing its ID value into the next1 field 53A and by writing a new time value into the time field 53B. The server 10 also writes a zero into the next2 field 53C to clear that entry.

Next, the method of FIG. 5C proceeds to a step 267. At the step 267, the server 10 releases the SCSI reservation so that other computing entities may again access the data storage unit 40. Next, at a step 268, the server 10 restarts the queue timer that was originally started at the step 249 of FIG. 5B. Next, the method terminates at a step 269, with a successful renewal of the entry in the queue 52A.

At the step 270, the server 10 effectively claims control of the lock 50A. If the owner field 51A does not already contain the ID value of the server 10, then the server 10 does claim control of the lock 50A by writing its own ID value into the owner field 51A and by writing a new time value into the time field 51B. If the owner field 51A already contains the ID value of the server 10, then the server 10 simply writes a new time value into the time field 51B. In either case, the server 10 now has exclusive access to the file 48A for a renewable lease period, beginning at this point in time.

Next, the method proceeds to a step 271. At the step 271, the server 10 updates the queue, if necessary. If the next1 field 53A contains the ID value of the server 10 and the second entry of the queue 52A contains a valid entry, then the server 10 copies the second entry of the queue into the first entry, by copying the ID value from the next2 field 53C to the next1 field 53A and by copying the time value from the time field 53D to the time field 53B. In this case, the server 10 also clears the second entry in the queue by writing a zero to the next2 field 53C. If the next1 field 53A contains the ID value of the server 10 and the second entry in the queue 52A does not contain a valid entry, then the server 10 clears the first entry in the queue by writing a zero to the next1 field 53A. If the next2 field 53C contains the ID value of the server 10, then the server 10 clears the second entry in the queue by writing a zero to the next2 field 53C.

Next, at a step 272, the server 10 releases the SCSI reservation so that other computing entities may again access the data storage unit 40. Next, at a step 273, the server 10 begins a renewal timer just as described above in connection with the step 210 of FIG. 5A. Also at this step, the server 10 may stop the queue timer that was started at the step 249 of FIG. 5B. Next, the method terminates at a step 274, with a successful acquisition of the lock 50A.

In either the first embodiment or the second embodiment described above, when a computing entity has gained control of a data entity by acquiring the respective lock, the computing entity will preferably continue to renew its lease on the data entity for as long as it needs to access the data entity. A renewal timer was started for this purpose at the step 210 of FIG. 5A, at the step 242 of FIG. 5B or at the step 273 of FIG. 5C. When this renewal timer goes off, the computing entity may perform the method of FIG. 5D to renew its lease. Again, the following description is made in terms of the server 10, the file 48A and the lock 50A, although it also applies to other computing entities and other data entities, along with their corresponding locks. Thus, suppose the server 10 currently has a lease of the lock 50A, and its renewal timer just went off. The server 10 may perform the method of FIG. 5D to renew the lease.

Figure 5E:
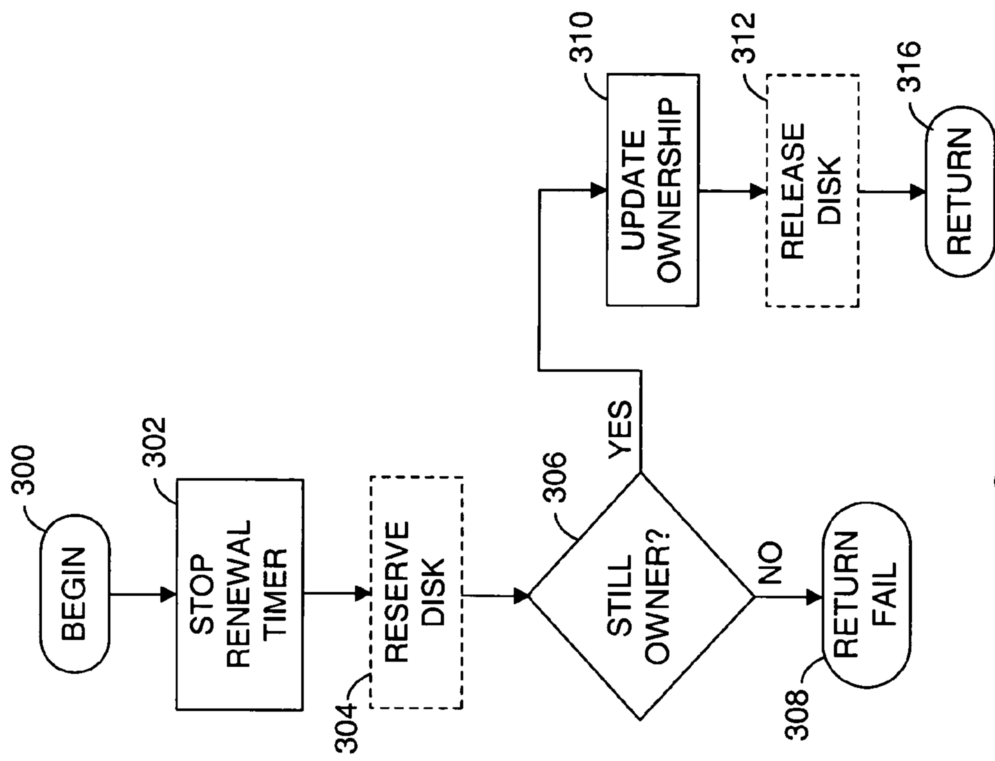
FIG. 5E is a flow chart illustrating a method that is used in the first and second embodiments of this invention for releasing a lock on a data entity.
Figure 5D:
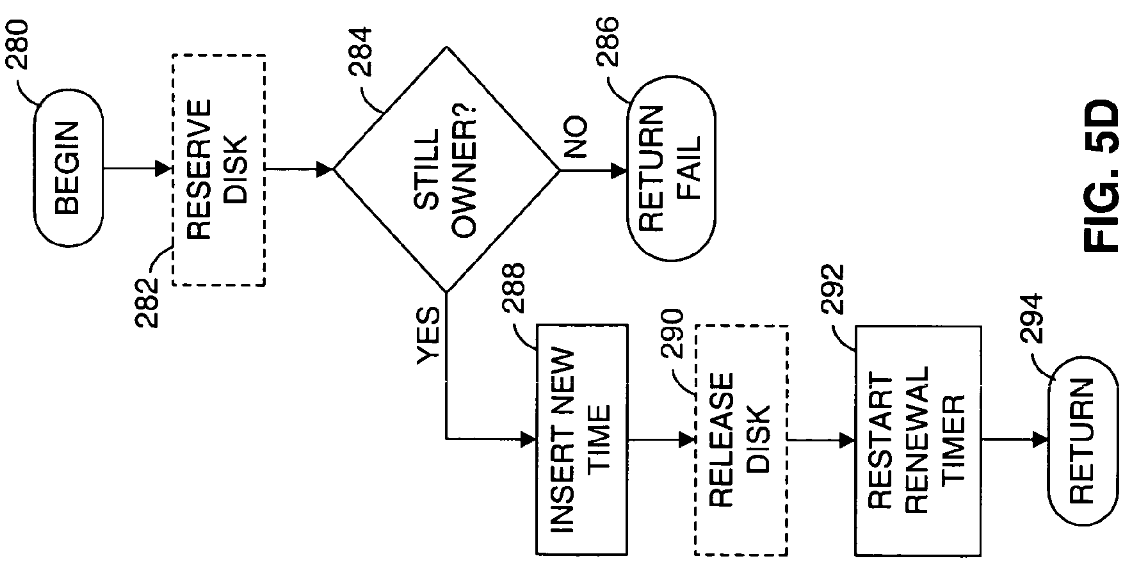
FIG. 5D is a flow chart illustrating a method that is used in the first and second embodiments of this invention for renewing a lock on a data entity.

The method of FIG. 5D begins at an initial step 280. Next, at an optional step 282, the server 10 reserves the data storage unit 40, such as by using a SCSI reservation system. This step is optional because, in many implementations, it will not be necessary to reserve the data storage unit 40 because the steps that are performed in this method do not risk corrupting any data in the file system 42A. In such a case, the SCSI reservation is not used, so that other computing entities can continue using the file system 42A, which improves the overall performance of the system.

After the step 282, the method of FIG. 5D proceeds to a decision step 284. In this step, the server 10 reads the value in the owner field 51A to determine if it is still the owner of the lock 50A. If the owner field 51A contains the ID value for the server 10, then the server 10 is still the owner of the lock 50A, and the method proceeds to a step 288. If the owner field 51A does not contain the ID value for the server 10, then some sort of error has occurred. In this case, the method terminates at a step 286, returning a failure condition.

At the step 288, the server 10 renews its lease on the lock 50A by writing a new time value into the time field 51B. The server 10 now has exclusive access to the file 48A for another lease period, beginning at this new point in time. This write to the time field 51B may be performed by one of at least two methods. First, the server 10 may simply write to the data block containing the time field 51B, without performing the SCSI reservation at the optional step 282, and without first reading the data block. In this case, the server 10 uses an updated value for the time field 51B and the last known data for the rest of the data block. This can generally only be done if none of the data within the data block is subject to change by another computing entity because any such changes would generally be overwritten by the server 10. For example, if the queue 52A is used, the queue 52A should be located in a different data block from the time field 51B; otherwise the server 10 may blindly overwrite any queue data the next time it renews a lease. For the same reason, the queue 46 should be in a different data block from the time field 45B if this method will be used to write to the time field 45B to renew the lock 44. The second method involves performing the SCSI reservation at the step 282, reading the data block containing the time field 51B, updating the value for the time field 51B and writing the data block back to the file 48A.

Next, the method proceeds to an optional step 290. This optional step 290 is performed if the step 282 was performed earlier in the method. At this step 290, the server 10 releases the SCSI reservation so that other computing entities may again access the data storage unit 40. Next, at a step 292, the server 10 restarts the renewal timer so that it can be notified again before this new lease period ends. Next, the method terminates at a step 294.

In either the first embodiment or the second embodiment described above, if a computing entity is finished accessing a data entity before its lease for the data entity expires, the computing entity preferably releases the lock on the data entity, so that another computing entity may acquire it. The computing entity may perform the method of FIG. 5E to release the lock. Again, the following description is made in terms of the server 10, the file 48A and the lock 50A, although it also applies to other computing entities and other data entities, along with their corresponding locks. Thus, suppose the server 10 currently has a lease of the lock 50A, but it has finished accessing the file 48A. The server 10 may perform the method of FIG. 5E to release the lock 50A.

The method of FIG. 5E begins at an initial step 300. Next, at a step 302, the server 10 stops the renewal timer that was started at the step 210 of FIG. 5A, at the step 242 of FIG. 5B or at the step 273 of FIG. 5C. Next, at an optional step 304, the server 10 reserves the data storage unit 40, such as by using a SCSI reservation system. This step is optional for a reason that is similar to the reason that the step 282 of FIG. 5D is optional. If the server 10 may complete the method of FIG. 5E without having to (1) read a data block from the file 48A, (2) modify the data in that data block and then (3) write the data block back to the file 48A, then performing this method generally does not risk corrupting any data in the file system 42A, and the SCSI reservation is preferably not used. If such a read-modify-write must be performed, however, then the step 304 should be performed. Generally, the step 304 must be performed if a queue is to be updated during this method or if the ownership of the lock is to be updated based on information from a queue. If, however, the ownership of the lock is simply cleared in this method by writing a zero to the owner field, then the step 304 generally need not be performed.

After the step 304, the method of FIG. 5E proceeds to a decision step 306. At this step, the server 10 reads the value in the owner field 51A to determine if it is still the owner of the lock 50A. If the owner field 51A contains the ID value for the server 10, then the server 10 is still the owner of the lock 50A, and the method proceeds to a step 310. If the owner field 51A does not contain the ID value for the server 10, then some sort of error has occurred. In this case, the method terminates at a step 308, returning a failure condition.

At the step 310, the server 10 updates the ownership of the lock 50A and the ownership of the queue 52A if the queue 52A is used. If the queue 52A is not used or if it does not contain any valid entries, then the server 10 simply releases the lock 50A by writing a zero to the owner field 51A and the method proceeds. If the queue 52A is used and if it contains a valid entry, then the server 10 copies the highest priority valid entry into the lock 50A and the server 10 updates the queue 52A. If the first entry contains a valid entry, then the server 10 copies the first entry into the lock 50A by copying the ID value from the next1 field 53A to the owner field 51A and the time value from the time field 53B to the time field 51B. If the second entry also contains a valid entry, then the server 10 also copies the second entry into the first entry by copying the ID value from the next2 field 53C to the next1 field 53A and the time value from the time field 53D to the time field 53B, and the server 10 also clears the second entry of the queue 52A by writing a zero to the next2 field 53C. If the first entry is valid, but the second entry is not valid, then, after copying the first entry into the lock 50A, the server 10 clears the first and second entries by writing a zero to the next1 field 53A. If the second entry is valid, but the first entry is not valid, then the server 10 copies the second entry into the lock 50A by copying the ID value from the next2 field 53C to the owner field 51A and the time value from the time field 53D to the time field 51B, and the server 10 also clears the first and second entries of the queue 52A by writing a zero to the next2 field 53C.

Next, the method proceeds to an optional step 312. This optional step 312 is performed if the step 304 was performed earlier in the method. At this step 312, the server 10 releases the SCSI reservation so that other computing entities may again access the data storage unit 40. Next, the method terminates at a step 316.

A first embodiment of this invention comprises the metadata illustrated in FIG. 3 related to the data entity locks, such as the locks 44 and 50A, along with the methods of FIGS. 5A, 5D and 5E. This first embodiment does not use queues, such as the queues 46 and 52A. In this first embodiment, if a computing entity is unsuccessful in an attempt to acquire a lock, the computing entity must keep making additional attempts to acquire the lock, or it will not be able to use the desired data entity. The second embodiment, on the other hand, does use queues, such as the queues 46 and 52A. Thus, the second embodiment comprises the metadata illustrated in FIG. 3 related to the data entity locks, such as the locks 44 and 50A, and the metadata related to the queues, such as the queues 46 and 52A, along with the methods of FIGS. 5B, 5C, 5D and 5E. In this second embodiment, if a computing entity is unsuccessful in an attempt to acquire a lock, the computing entity may generally place its ID value on the respective queue, which gives the computing entity priority over other computing entities in being able to acquire the lock when the data entity becomes available. As described above, this technique promotes fairness between the computing entities with respect to their abilities to acquire locks to obtain access to data entities.

Each of the first two embodiments enables a computing entity to acquire a lock for a data entity, such as a particular file, a particular directory or the file system itself. Any computing entity that has access to the file system 42A may generally acquire any of these locks by following the methods described above. When a computing entity acquires one of these locks, the computing entity has exclusive access to the corresponding data entity for a predefined, extendable lease period. This exclusive access enables the computing entity to read data from the data entity and write data to the data entity. Thus, in the case of the data entity being a file, the computing entity may read data from the file or write data to the file. The computing entity may also read or write any metadata related to the file that is contained within the file. In the case of the data entity being a directory or the file system itself, the computing entity may read or write any of the metadata related to the data entity. Thus, the computing entity may rename a file, add a file to a directory, delete a sub-directory, etc.

Figure 6A:
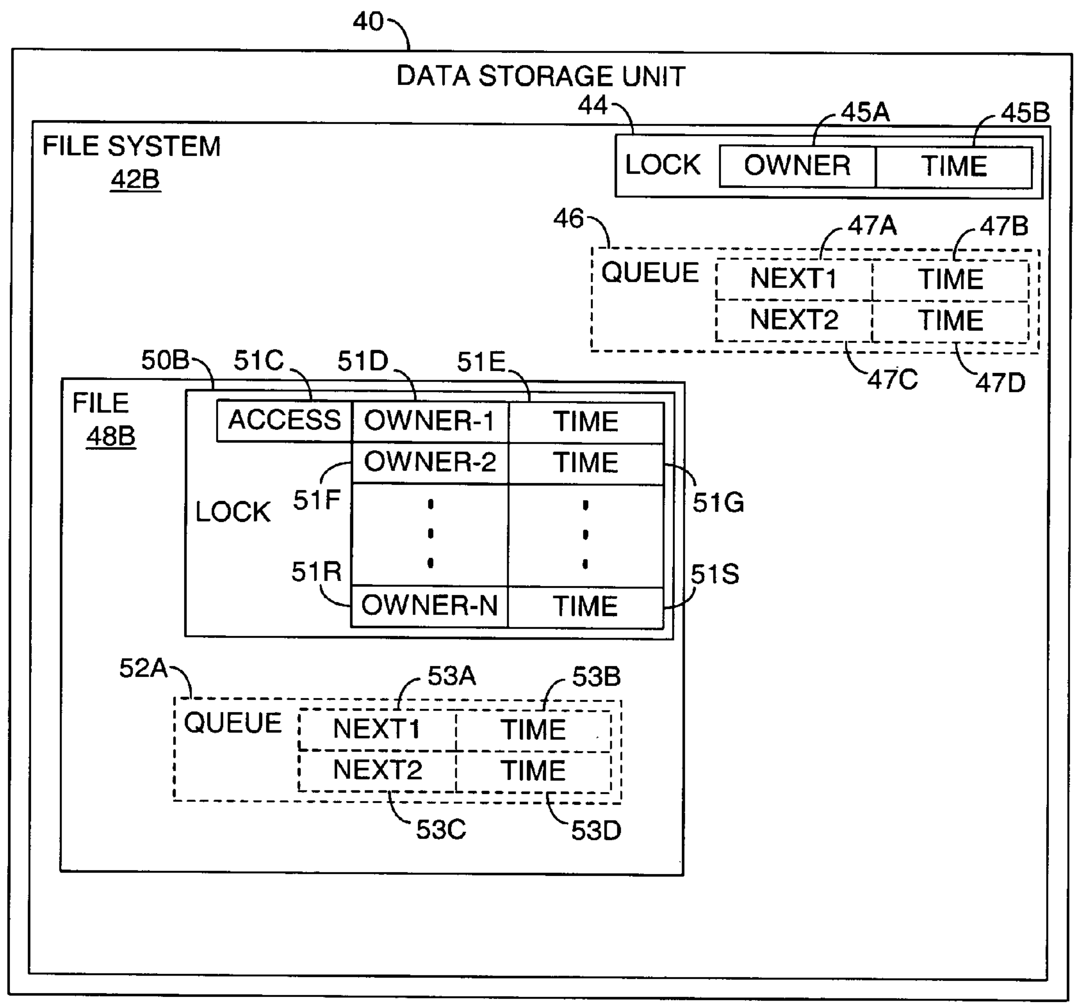
FIG. 6A illustrates a second configuration for locking data that may be used in this invention to enable multiple servers to access a file system concurrently.
Figure 6B:
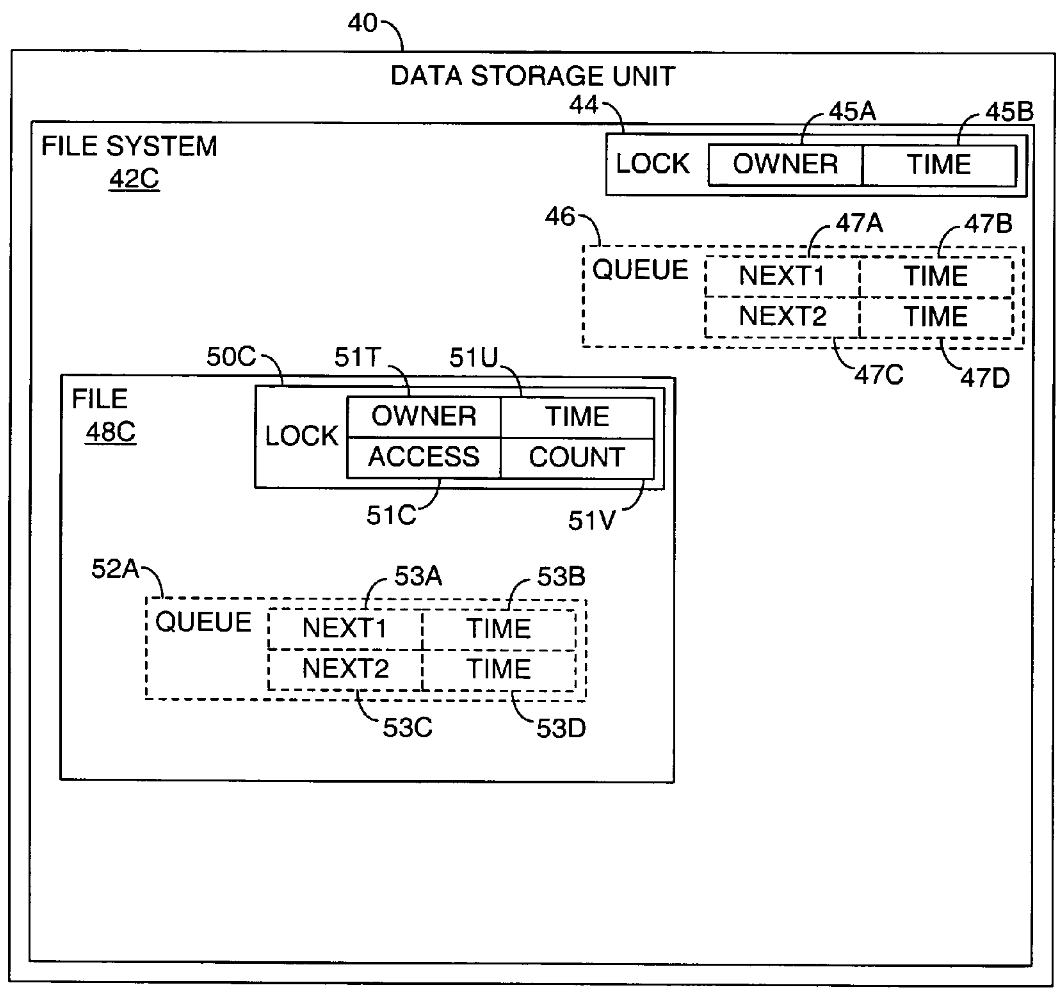
FIG. 6B illustrates a third configuration for locking data that may be used in this invention to enable multiple servers to access a file system concurrently.

In the preferred embodiment, the granularity of the locking mechanism for this invention is at the file level. In the first two embodiments of the invention, computing entities may gain exclusive access to any file in the system. When one computing entity has exclusive access to a file, no other computing entity may access the file in any manner, to read or write data to the file or to read or modify any metadata contained in the file. However, another computing entity may still access other files in the file system 42A that are not currently owned by another computing entity. Such an implementation, in which computing entities are given exclusive access on a file-level granularity, is often quite useful. One advantage of the file-level granularity is that a server 10, 12 or 18 may cache parts of an open file on the server, with no cache consistency issues, as long as the cached data is discarded when the file is closed. In some situations, however, it may be advantageous to give multiple computing entities access to a single file at the same time, for read-only purposes, instead of giving exclusive access to a single computing entity. For example, a configuration file may be created that represents a standard VM. Any physical computer that can access the configuration file can run virtualization software that can then read the configuration file and create on the physical computer system a new instance of the standard VM. The configuration file may be set as a read-only file, so that multiple physical computers can be reading the configuration file at the same time, to create a different instance of the VM on each physical computer. FIGS. 6A and 6B show different versions of locking metadata that may be used to provide this capability. In this case, for example, each of the servers 10, 12 and 18 may obtain read-only access to the file 48A at the same time. When in this read-only mode, none of the servers 10, 12 and 18 may write to the file 48A, but each of them may read from the file.

FIG. 6A shows the data storage unit 40, containing a file system 42B. The file system 42B may be substantially the same as the file system 42A, except for the changes to the metadata described below. The file system 42B may contain the same lock 44 as described above, including the owner data field 45A and the time data field 45B. The file system 42B may also contain the same queue 46 as described above, including the next1 data field 47A, the next2 data field 47C, and the time data fields 47B and 47D. The file system 42B may also contain the same types of data entities as the file system 42A and these data entities may be substantially the same as the data entities of the file system 42A, except for the locking metadata, as described herein. The file system 42B may contain a file 48B, for example, which is substantially the same as the file 48A, except for the locking metadata as described herein.

The file 48B contains a lock 50B. The lock 50B contains an access field 51C, which indicates whether the lock 50B is reserved for exclusive, read and write access by a single computing entity or whether the lock 50B is available for read-only access by multiple computing entities. The lock 50B also comprises a plurality of owner data fields, namely an owner-1 data field 51D, an owner-2 data field 51F . . . and an owner-N data field 51R, along with a corresponding time data field for each of the owner data fields, namely a time data field 51E, a time data field 51G . . . and a time data field 51S, respectively. Each of the owner data fields 51D, 51F and 51R may be substantially the same as the owner data field 51A of the lock 50A, except as described below, and the time data fields 51E, 51G and 51S may be substantially the same as the time data field 51B of the lock 50A, except as described below. If the time fields 51E, 51G and 51S will be updated using a simple write, instead of a read-modify-write, as described above in connection with the step 288 of FIG. 5D, then each of the time fields 51E, 51G and 51S should be in a different data block.

FIG. 6B shows the data storage unit 40, containing a file system 42C. The file system 42C may also be substantially the same as the file system 42A, except for the changes to the metadata described below. The file system 42C may contain the same lock 44 as described above, including the owner data field 45A and the time data field 45B. The file system 42C may also contain the same queue 46 as described above, including the next1 data field 47A, the next2 data field 47C, and the time data fields 47B and 47D. The file system 42C may also contain the same types of data entities as the file system 42A and these data entities may be substantially the same as the data entities of the file system 42A, except for the locking metadata, as described herein. The file system 42C may contain a file 48C, for example, which is substantially the same as the file 48A, except for the locking metadata as described herein.

The file 48C contains a lock 50C. The lock 50C contains the same access field 51C as the lock 50B, which indicates whether the lock 50C is reserved for exclusive, read and write access by a single computing entity or whether the lock 50C is available for read-only access by multiple computing entities. Unlike the lock 50B, the lock 50C comprises only a single owner data field, namely an owner data field 51T, which may be substantially the same as the owner-1 data field 51D of the lock 50B, except as described below, along with a single corresponding time data field, namely a time data field 51U, which may be substantially the same as the time data field 51E, except as described below. The lock 50C also contains a count field 51V, which contains a count of the number of computing entities that are currently signed up for read-only access of the file 48C. If the time field 51U will be updated using a simple write, instead of a read-modify-write, as described above in connection with the step 288 of FIG. 5D, then the count field 51V should be in a different data block from the time field 51U.

Figure 6C:
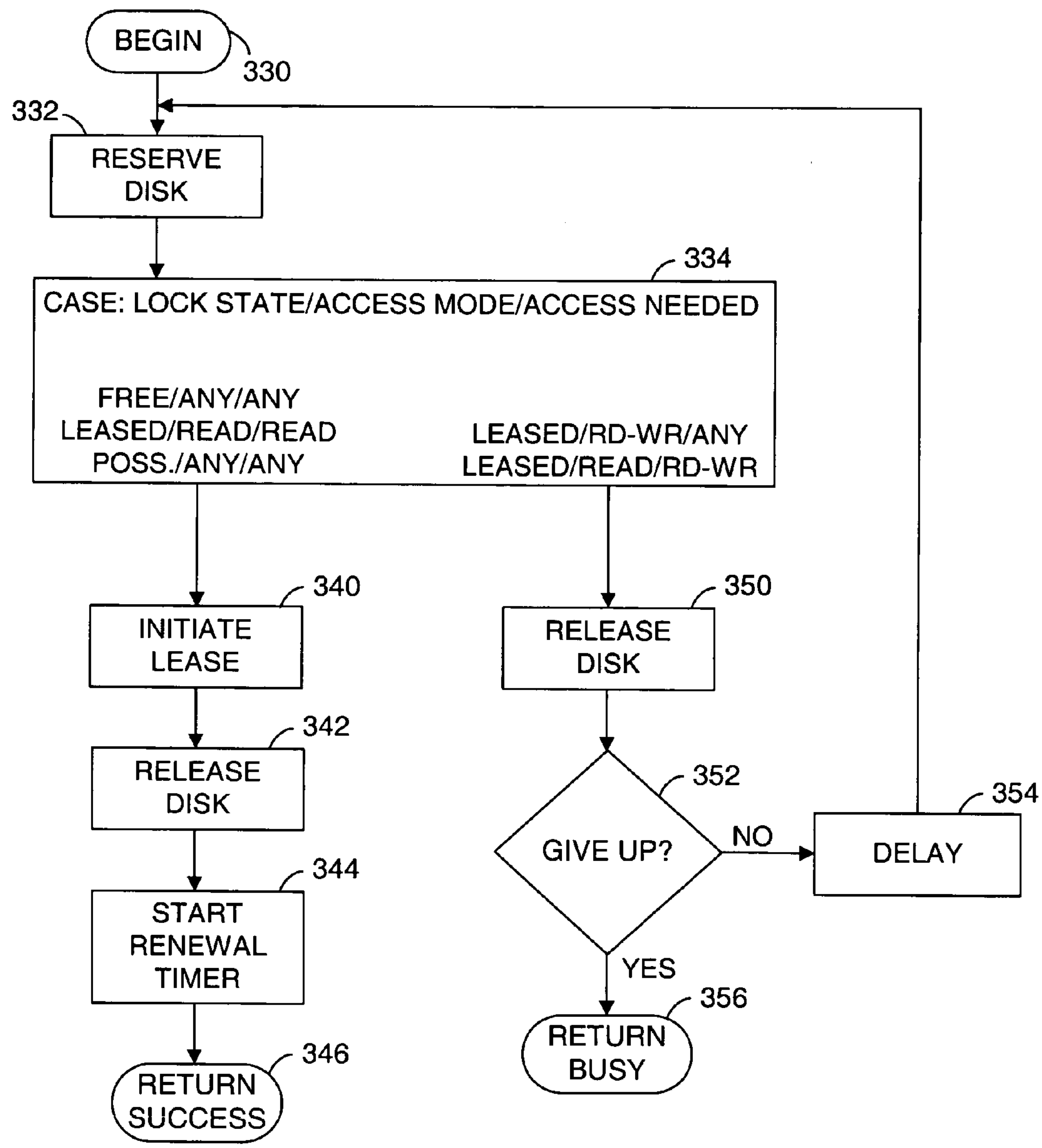
FIG. 6C is a flow chart illustrating a method that may be used for attempting to obtain access to a data entity when either the second or third configurations for locking data are used.

FIG. 6C is a flow chart illustrating a method that may be used by a computing entity to attempt to gain control of a lock within a file system, when the lock has the metadata illustrated in either FIG. 6A or 6B. The following description is made in terms of the server 10 attempting to gain control of the locks 50B and 50C within the files 48B and 48C, respectively, although it also applies to other computing entities and other data entities, along with their corresponding locks.

The method of FIG. 6C begins at an initial step 330. Next, at a step 332, the server 10 reserves the data storage device 40, such as by using the SCSI reservation system.

Next, the method of FIG. 6C proceeds to a step 334. At this step, the server 10 determines three factors that determine which steps are to be performed next. First, the server 10 determines the state (referred to as "Lock State" in the block for the step 334) of the file 48B or 48C, namely whether the file is in the free state 102, the leased state 106 or the possessed state 110. Next, if the file 48B or 48C is in either the leased state 106 or the possessed state 110, the server 10 further determines whether the file 48B or 48C has been reserved for exclusive use by another computing entity or whether it has been reserved for read-only use (referred to as "Access Mode" in the block for the step 334). Third, the server 10 determines whether it needs to access the file 48B or 48C for both reading and writing, or whether it only needs to read from the file 48B or 48C (referred to as "Access Needed" in the block for the step 334).

To determine the Lock State and the Access Mode, the server 10 reads the locking metadata from the file 48B or 48C. In the case of the file 48B, the server 10 reads the access field 51C, the owner-1 field 51D, the time field 51E, the owner-2 field 51F, the time field 51G . . . the owner-N field 51R and the time field 51S. In the case of the file 48C, the server 10 reads the access field 51C, the owner field 51T, the time field 51U and the count field 51V. The server 10 may read all of these fields at one time, or it may read them individually or in groups, as needed.

Turning first to the file 48B, if the owner-1 field 51D contains a zero, then the lock 50B is in the free state 102. If the owner-1 field 51D contains the ID value of another computing entity and the access field 51C of the lock 50B contains a value that indicates that the lock 50B has been reserved for exclusive use, then the lock 50B has been leased on an exclusive basis by the computing entity identified in the owner-1 field. The time field 51E can now be used to determine if this exclusive lease has expired. This determination may be made in the same manners as described above in connection with the step 204 of FIG. 5A. If the lease has not expired, then the file 48B is in the leased state 106; if the lease has expired, then the file 48B is in the possessed state 110.

If the owner-1 field 51D contains the ID value of another computing entity and the access field 51C of the lock 50B contains a value that indicates that the lock 50B has been reserved for read-only use, then the lock 50B has been leased on a non-exclusive, read-only basis by one or more computing entities. In this case, any of the owner fields 51D, 51F . . . 51R that contains the ID value of a computing entity represents a read-only lease to the respective computing entity. Thus, suppose the owner-1 field 51D and the owner-2 field 51F each contains the ID value of a computing entity, and that all other owner fields contain a zero. In this case, there are two entities that are sharing access to the file 48B on a read-only basis. The expiration time of each such lease can be determined by reference to the corresponding time field 51E, 51G . . . 51S. Thus, the first lease to the computing entity identified in the owner-1 field 51D expires according to the time field 51E and the second lease to the computing entity identified in the owner-2 field 51F expires according to the time field 51G. These determinations may also be made in the same manners as described above in connection with the step 204 of FIG. 5A. If all of the non-exclusive leases have expired, then the lock 50B is in the possessed state 110, but if any of the non-exclusive leases has not yet expired, then the lock 50B is in the leased state 106.

Turning next to the file 48C, if the owner field 51T contains a zero, then the lock 50C is in the free state 102. If the owner field 51T contains the ID value of another computing entity and the access field 51C of the lock 50C contains a value that indicates that the lock 50C has been reserved for exclusive use, then the lock 50C has been leased on an exclusive basis by the computing entity identified in the owner field. The time field 51U can now be used to determine if this exclusive lease has expired. This determination may be made in the same manners as described above in connection with the step 204 of FIG. 5A. If the lease has not expired, then the file 48C is in the leased state 106; if the lease has expired, then the file 48C is in the possessed state 110.

If the owner field 51T contains the ID value of another computing entity and the access field 51C of the lock 50C contains a value that indicates that the lock 50C has been reserved for read-only use, then the lock 50C has been leased on a non-exclusive, read-only basis by one or more computing entities. In this case, the count field 51V generally indicates the number of computing entities that are currently sharing access to the file 48C on a read-only basis. In this case also, the time value in the time field 51U may be used to determine when the last of all pending leases will expire. Any computing entity that begins or renews a non-exclusive lease writes a new time value to the time field 51U, so that the time field 51U always represents the start time of the most recently begun or renewed lease. The determination of whether the most recent lease has expired may also be made in the same manners as described above in connection with the step 204 of FIG. 5A. If the most recent non-exclusive lease has expired, then the lock 50C is in the possessed state 110, but if the most recent non-exclusive lease has not yet expired, then the lock 50C is in the leased state 106.

In the case of either of the files 48B or 48C, the box representing the step 334 in FIG. 6C indicates the possible outcomes of the determinations described above and the subsequent steps to be performed for each possible set of outcomes. Specifically, if the file 48B or 48C is determined to be in the free state 102, then the method of FIG. 6C proceeds to a step 340 regardless of the Access Mode (represented by the value in the respective access field 51C) or the Access Needed (the type of access required by the server 10). If the file 48B or 48C is determined to be in the leased state 106, the respective access field 51C contains a value that indicates a read-only lease and the server 10 needs only read-only access, then the method also proceeds to the step 340. If the file 48B or 48C is determined to be in the possessed state 110, then the method also proceeds to the step 340 regardless of the value in the respective access field 51C and regardless of the type of access required by the server 10.

If the file 48B or 48C is determined to be in the leased state 106 and the respective access field 51C contains a value that indicates an exclusive, read and write lease, then the method proceeds to a step 350 regardless of the type of access required by the server 10. If the file 48B or 48C is determined to be in the leased state 106, the respective access field 51C contains a value that indicates a read-only lease and the server 10 needs both read and write access, then the method also proceeds to the step 350.

At the step 340, the server 10 initiates a lease for itself for use of the file 48B or 48C. The nature of the lease and the actions taken to initiate the lease depend on the circumstances under which the server 10 has arrived at this step. If the file 48B or 48C is in the free state 102, then the server 10 may simply sign up for whatever type of lease it needs. If the server 10 needs read and write access to the file 48B or 48C, then the server 10 signs up for an exclusive lease by writing the appropriate value to the respective access field 51C. If the server 10 needs only read access to the file 48B or 48C, then the server 10 preferably signs up for a non-exclusive, read-only lease, again by writing the appropriate value to the respective access field 51C. For the file 48B, the server 10 also writes its own ID value to the owner-1 field 51D and a new time value to the time field 51E. For the file 48C, the server 10 also writes its own ID value to the owner field 51T and a new time value to the time field 51U. For read-only access to the file 48C, the server 10 also writes a count of one to the count field 51V.

If the file 48B or 48C is in the leased state 106 and the lease is a read-only lease, then the server 10 signs up for a shared, read-only lease with whichever other computing entities have already signed up for such a lease. For the file 48B, the server 10 begins with the owner-1 field 51D and proceeds toward the owner-N field 51R, looking for the first owner field that contains a zero. The server 10 then writes its own ID value into the first such owner field and then writes a new time value into the corresponding time field 51E, 51G . . . 51S. For example, if the owner-2 field 51F is the first owner field that contains a zero, then the server 10 writes its own ID value into the owner-2 field 51F and a new time value into the time field 51G. For the file 48C, the server 10 writes its own ID value into the owner field 51T and a new time value into the time field 51U. The server 10 also increments the count field 51V by one. Also, if the file 48B or 48C is in the possessed state 110, the lease is a read-only lease and the server 10 needs only read-only access, then the server 10 also signs up for a shared, read-only lease with whichever other computing entities have already signed up for such a lease. The server 10 signs up for this shared, read-only lease in the same manner as was just described.

Now if the file 48B or 48C is in the possessed state 110 and the lease is an exclusive, read and write lease, then the server 10 must break the existing lease and initiate its own lease. Also, if the file 48B or 48C is in the possessed state 110 and the lease is a shared, read-only lease, but the server 10 needs exclusive access, then the server 10 must also break the existing lease and initiate its own lease. In either case, for the file 48B, the server 10 writes its own ID value into the owner-1 field 51D and a new time value into the time field 51E. The server 10 also writes a zero to any other owner field that doesn't already contain a zero. For the file 48C, the server 10 writes its own ID value into the owner field 51T and a new time value into the time field 51U. The server 10 also writes a one to the count field 51V. Also, for either the file 48B or 48C, the server 10 writes an appropriate value to the respective access field 51C, depending on whether the server 10 requires exclusive read and write access or whether it can get by with read-only access.

Next, the method proceeds to a step 342. At this step, the server 10 releases the SCSI reservation so that other computing entities may again access the data storage unit 40. Next, at a step 344, the server 10 begins a renewal timer that is set to track the time of a lease period. When the renewal timer goes off, the server 10 may renew the current lease if the server is still using the file 48B or 48C by writing a new time value in the same time field that it wrote to during the step 340. After the step 344, the method terminates at a step 346, with a successful acquisition of the lock 50B or 50C.

At the step 350, the server 10 also releases the SCSI reservation, but in this case the server 10 has not initiated a lease for itself. The server 10 has no authority to access the file 48B or 48C for either read or write access. Next, the method proceeds to a step 352. Here again, the server 10 must decide whether or not to give up on obtaining control of the lock 50B or 50C. This step may be performed in substantially the same manner as the step 216 of FIG. 5A. If the server 10 does not give up on obtaining the lock 50B or 50C at the step 352, then the method proceeds to a step 354. At this step, the server 10 delays a period of time before returning to the step 332 to try again to obtain the lock 50B or 50C. If the server 10 does give up on obtaining the lock 50B or 50C, the method proceeds to a terminal step 356. At this point, the server 10 returns to another software routine, reporting that the file 48B or 48C is not currently available.

The method of FIG. 6C, along with the locking metadata of either FIG. 6A or 6B and methods corresponding to the methods of FIGS. 5D and 5E, may be used to provide multiple computing entities with concurrent access to a file system, with individual data entities within the file system being accessed in either a read and write mode by a single computing entity or in a read-only mode by one or more computing entities. Other embodiments of the invention are also possible. For example, queues, such as the queues 46 and 52A, may also be used in conjunction with the locking metadata shown in FIGS. 6A and 6B, using methods that correspond with the methods of FIGS. 5B, 5C, 5D and 5E. In this case, if a computing entity wants to lease a data entity on a basis that is incompatible with a current, unexpired lease, such as if either the desired lease or the existing lease is exclusive, then the computing entity may claim an entry in a corresponding queue and then acquire the lock when it becomes available.

As mentioned above, this invention is particularly advantageous in a virtual computer system. Thus, the servers 10, 12 . . . 18 may include a plurality of VMs 13, as illustrated in FIG. 2. Each of the servers 10, 12 . . . 18 may include zero, one or more VMs 13. Each VM 13 may attempt to acquire locks and access data entities within the file system 42 independently of the other VMs 13, either within the same server or in a different server. Thus, for example, a first VM 13 within the server 10 may acquire an exclusive lock on a first data entity, a second VM 13 within the server 10 may acquire an exclusive lock on a second data entity, a third VM 13 within the server 12 may acquire an exclusive lock on a third data entity, and a fourth data entity may be accessed by both the second VM 13 and the third VM 13 on a read-only basis.

Allowing multiple VMs 13, executing on multiple physical computers, to concurrently access a file system using this invention is advantageous for at least three reasons. First, it is convenient and efficient to configure multiple VMs if they share a common file system. An alternative would be to give each VM a separate LUN (logical unit number) within the data storage unit 40, on which the VM can create its own, separate file system. But then, a system administrator would have to reconfigure the data storage unit 40 each time a new VM is added or each time the storage resources assigned to the different VMs is modified. Instead, a single LUN may be used to host a single file system that is used by all of the VMs on the multiple physical computers. Then, if an additional VM is added to the computer system, a new file may simply be added to the file system and assigned to the new VM as a virtual disk drive. Also, if a change needs to be made to the storage resources assigned to each of the VMs, the metadata within the file system may be modified to, for example, increase the size of the file containing the virtual disk drive of one VM and decrease the size of the file containing the virtual disk drive of another VM.

Second, the VMs 13 may be migrated between the multiple servers using the techniques described in the '217 application, and they can continue to use the same file system 42 within the same data storage unit 40, regardless of the physical computer on which they are executing, so long as they have access to the data storage unit 40 from any of the physical computers. Third, the software routines needed to implement the methods of this invention may be implemented in a virtualization layer that is common to each of the physical computers. Each of the servers 10, 12 and 18 may contain a common virtualization platform for supporting the multiple VMs 13, and the inventive methods may be performed by this virtualization software. The guest software running within each of the VMs 13 may not even need to know that the file system is being shared with other computing entities.

This invention provides a distributed file system that allows multiple computing entities to concurrently access a file system, without requiring that the computing entities send messages to each other containing locking information. In a typical computer system, this eliminates the need for the computing entities to be networked together in a separate computer network. Also, in this invention, there is no master for any of the locking information, like there is in the prior art distributed file systems illustrated in FIG. 1B. Instead, in this invention, locking information is stored within the metadata of the file system itself and computing entities are able to check for and acquire locks for data entities on their own, by reading and modifying the locking information directly in the file system. In the preferred embodiment, the SCSI reservation system is used to lock the file system while a computing entity is checking for and acquiring a lock, although other temporary locking mechanisms may also be used.

Any computing entity that may access the file system may modify this locking information to acquire a lock on a data entity, without requiring any extra configuration for either the computing entity or the file system. This makes it easy for any server that is newly connected to the data storage unit to immediately begin executing VMs, which may be newly created or may be migrated from an existing server. Acquiring a lock in this manner gives the computing entity a renewable lease to use the data entity protected by the lock for a specified period of time, which may preferably be renewed for as long as desired by the computing entity. Once the lease period expires, however, from either an initial lease or a renewed lease, the lease may be broken by another computing entity that wants to obtain the lock. This breakable, renewable lease ensures that a crash of a computing entity does not tie up a lock indefinitely. Despite the failure of a computing entity that holds a lock, once the lease on the lock expires, another computing entity may unilaterally break the lease and claim the lock for itself.

What is claimed is:

1. A method for attempting to access a first data entity in a file system, the method being performed by a first computing entity, the file system also including one or more additional data entities that are concurrently accessible to at least one other computing entity, the method comprising:

the first computing entity attempting to obtain a lease for itself on the first data entity without needing another computing entity acting on its behalf, by reading, using a processor, an owner field included in the file system that can be used to determine whether the first data entity is leased by a computing entity and a time field included in the file system that can be used to determine whether a lease for the first data entity has expired and:

if the owner field indicates that the first data entity is not currently leased, the first computing entity writing to the owner field in the file system to indicate an assumption of a lease of the first data entity and writing to the time field in the file system to indicate when the lease expires; else if the owner field indicates that the first data entity has been leased, the first computing entity reading the time field in the file system and:

if the time field indicates that the lease has expired, the first computing entity writing to the owner field in the file system to break the existing lease and to indicate an assumption of a new lease and the first computing entity writing to the time field in the file system to indicate when the new lease expires; else if the time field indicates that the lease is still active, concluding that the first data entity is currently unavailable; and if a lease is obtained, the first computing entity accessing the first data entity while the lease is in effect.

2. The method of claim 1, wherein the first data entity is a file.

3. The method of claim 2, wherein the first data entity includes metadata and the owner field is located in this metadata.

4. The method of claim 1, wherein the first data entity is a directory.

5. The method of claim 1, wherein the step of the first computing entity writing to the owner field to indicate an assumption of a lease of the first data entity comprises the first computing entity writing a data value to the owner field that uniquely identifies the first computing entity.

6. The method of claim 5, wherein the data value that uniquely identifies the first computing entity is determined autonomously by the first computing entity.

7. The method of claim 5, wherein the owner field indicates that the first data entity is not currently leased when the owner field contains a value of zero.

8. The method of claim 1, wherein a lease expires a predetermined period of time after the lease begins, and wherein the step of the first computing entity writing to the time field to indicate when the lease expires comprises the first computing entity writing a current time value to the time field.

9. The method of claim 1, wherein the first computing entity determines whether a prior lease has expired by reading a first value from the time field, delaying for a predetermined lease period and reading a second value from the time field, wherein the first computing entity determines that the prior lease has expired if the second value is the same as the first value, and the first computing entity determines that the prior lease has not expired if the second value is different from the first value.

10. The method of claim 1, wherein the steps of reading the owner field and reading the time field are both performed in a single read operation.

11. The method of claim 1, wherein, if the first computing entity concludes that the first data entity is currently unavailable, the first computing entity further writes an entry to a queue owner field in a queue in the file system to indicate an interest in accessing the first data entity.

12. The method of claim 11, wherein the first computing entity also writes to a queue time field in the queue in the file system to indicate a period of time for which the entry to the queue owner field is valid.

13. The method of claim 1 further comprising the first computing entity reserving a disk on which the owner field and the time field are located to ensure exclusive access to the disk for the reading and writing of the owner field and the time field.

14. The method of claim 1, wherein, if a lease is obtained, the first computing entity also sets a renewal timer and, after the renewal timer expires, the first computing entity renews the lease by writing a new value to the time field.

15. The method of claim 1 wherein the owner field is stored in a file system lock structure in the file system.

16. A method for attempting to access a first data entity in a file system, the method being performed by a first computing entity, the file system also including one or more additional data entities that are concurrently accessible to at least one other computing entity, the method comprising:

the first computing entity attempting to access the first data entity without needing another computing entity acting on its behalf, reading, using a processor, an owner field included in the file system that can be used to determine whether the first data entity is in use by a computing entity and determining whether the first data entity is in use by a computing entity;

if the first data entity is not in use by a computing entity, the first computing entity writing to the owner field in the file system to take control of a lock on the first data entity; and if control of the lock is obtained, the first computing entity accessing the first data entity; else if control of the lock is not obtained, the first computing entity writing an entry to a queue owner field in the file system to indicate an interest in accessing the first data entity and waiting for an opportunity to access the first data entity.

17. The method of claim 16 further comprising, if the first data entity is in use by a computing entity, the first computing entity reading a time field in the file system to determine whether a lease on the data entity has expired and, if the lease has expired, the first computing entity writing to the owner field to break the existing lease and to indicate an assumption of a new lease of the first data entity.

18. The method of claim 17, wherein the first computing entity determines whether the lease has expired by reading a first value from the time field, delaying for a predetermined lease period and reading a second value from the time field, wherein the first computing entity determines that the lease has expired if the second value is the same as the first value, and the first computing entity determines that the lease has not expired if the second value is different from the first value.

19. The method of claim 16 further comprising, if the first data entity is not in use by a computing entity, in addition to writing to the owner field to take control of the lock on the first data entity, the first computing entity writing to a time field in the file system to indicate when a lease of the first data entity expires.

20. The method of claim 16, wherein the first data entity is a file.

21. The method of claim 20, wherein the first data entity includes metadata and the owner field is located in this metadata.

22. The method of claim 16, wherein the first data entity is a directory.

23. The method of claim 16 further comprising the first computing entity reserving a disk on which the owner field is located to ensure exclusive access to the disk for the reading and writing of the owner field.

24. The method of claim 16, wherein the first computing entity autonomously determines a data value that uniquely identifies the first computing entity and the first computing entity assumes a lock on the first data entity by writing the unique data value into the owner field.

25. The method of claim 16 further comprising, if control of the lock is not obtained, in addition to writing an entry to a queue owner field in the file system to indicate an interest in accessing the first data entity, the first computing entity writing to a queue time field in the file system to indicate a period of time for which the entry to the queue owner field is valid.

* * * * *